US012725601B2

(12) United States Patent
Kim et al.

(10) Patent No.: US 12,725,601 B2
(45) Date of Patent: Sep. 1, 2026

(54) ELECTRONIC DEVICE AND METHOD FOR DETECTING ERROR OF A SIGNAL

(71) Applicant: SAMSUNG ELECTRONICS CO., LTD., Suwon-si (KR)

(72) Inventors: Yangsu Kim, Suwon-si (KR); Beakkwon Son, Suwon-si (KR); Keunwon Jang, Suwon-si (KR); Gangyoul Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 271 days.

(21) Appl. No.: 18/483,146

(22) Filed: Oct. 9, 2023

(65) Prior Publication Data

US 2024/0127784 A1 Apr. 18, 2024

Related U.S. Application Data

(63) Continuation of application No. PCT/KR2023/013854, filed on Sep. 14, 2023.

(30) Foreign Application Priority Data

Oct. 14, 2022 (KR) ........................ 10-2022-0132712
Dec. 13, 2022 (KR) ........................ 10-2022-0173481

(51) Int. Cl.
*G10K 11/178* (2006.01)

(52) U.S. Cl.
CPC .. *G10K 11/17825* (2018.01); *G10K 11/17823* (2018.01); *G10K 11/17881* (2018.01);
(Continued)

(58) Field of Classification Search
CPC ....... G10K 11/17825; G10K 11/17823; G10K 11/17881; G10K 2210/108;
(Continued)

(56) References Cited

U.S. PATENT DOCUMENTS 8,358,969 B2 1/2013 Gore et al.
8,804,977 B2 8/2014 Neal et al.
(Continued)

FOREIGN PATENT DOCUMENTS

CN 110177317 A 8/2019
CN 110769352 7/2022
(Continued)

OTHER PUBLICATIONS

Search Report and Written Opinion dated Dec. 28, 2023 issued in International Patent Application No. PCT/KR2023/013854.
(Continued)

*Primary Examiner* — Vivian C Chin
*Assistant Examiner* — Douglas J Suthers
(74) *Attorney, Agent, or Firm* — NIXON & VANDERHYE P.C.

(57) ABSTRACT

An electronic device is provided. The electronic device includes a microphone. The electronic device includes a speaker. The electronic device includes a communication circuit. The electronic device includes at least one processor. The at least one processor is configured to obtain a second signal based on decoding a first signal received through the communication circuit from an external electronic device. The at least one processor is configured to output a third signal through the speaker obtained based on executing decompression the second signal. The at least one processor is configured to compensate the second signal based on a difference between the second signal and the third signal representing a distortion of the third signal, in response to obtaining an input signal including the output third signal through the microphone. The at least one processor is configured to execute cancellation of an echo of the input signal based on the compensated second signal.

19 Claims, 10 Drawing Sheets

(52) U.S. Cl.
CPC .................. *G10K 2210/108* (2013.01); *G10K 2210/3026* (2013.01); *G10K 2210/3027* (2013.01); *G10K 2210/3046* (2013.01); *G10K 2210/505* (2013.01)

(58) Field of Classification Search
CPC ... G10K 2210/3026; G10K 2210/3027; G10K 2210/3046; G10K 2210/505
USPC ........................................................ 381/66
See application file for complete search history.

(56) References Cited

U.S. PATENT DOCUMENTS

| | | | |
|---|---|---|---|
| 9,053,697 B2 | 6/2015 | Park et al. | |
| 9,697,845 B2 | 7/2017 | Hammarqvist | |
| 10,615,816 B2 | 4/2020 | Jang et al. | |
| 11,031,026 B2 | 6/2021 | Kostic et al. | |
| 2009/0110218 A1* | 4/2009 | Swain | H03G 5/165 381/300 |
| 2013/0163748 A1* | 6/2013 | Khanduri | H04M 9/082 379/406.01 |
| 2015/0187348 A1 | 7/2015 | Kang et al. | |
| 2019/0182588 A1* | 6/2019 | Andrieu | B06B 1/0276 |

FOREIGN PATENT DOCUMENTS

| | | |
|---|---|---|
| KR | 10-0857822 | 9/2008 |
| KR | 10-2009-0026504 | 3/2009 |
| KR | 10-1463324 | 11/2014 |
| KR | 10-2015-0079237 | 7/2015 |
| KR | 20150079237 A | 7/2015 |
| KR | 20190034807 A | 4/2019 |
| KR | 10-2021-0108232 | 9/2021 |
| KR | 10-2346660 | 12/2021 |

OTHER PUBLICATIONS

Extended European Search Report dated Nov. 3, 2025 issued in European Patent Application No. 23877519.1, 188 pp.

* cited by examiner

ELECTRONIC DEVICE AND METHOD FOR DETECTING ERROR OF A SIGNAL

CROSS-REFERENCE TO RELATED APPLICATIONS

This application is a continuation of International Application No. PCT/KR2023/013854 designating the United States, filed on Sep. 14, 2023, in the Korean Intellectual Property Receiving Office and claiming priority to Korean Patent Application Nos. 10-2022-0132712, filed on Oct. 14, 2022, in the Korean Intellectual Property Office, and 10-2022-0173481, filed on Dec. 13, 2022, in the Korean Intellectual Property Office, the disclosures of each of which are incorporated by reference herein in their entireties.

BACKGROUND

Field

The disclosure relates to an electronic device and a method for detecting an error of a signal. For example, the disclosure relates to an electronic device and a method for detecting an error of a signal, such as distortion or mute, which may occur in a process of outputting a signal received by an electronic device through a sound output device.

Description of Related Art

In case that a user uses a service such as a voice call, an electronic device may obtain a digital signal from an external electronic device, may execute amplification and decompression, and play it in a form of an analog signal through a speaker. In case that a voice signal played through a speaker is input back to a microphone of an electronic device, an echo may be generated. An electronic device may cancel an echo through an echo canceller.

SUMMARY

According to an example embodiment of the disclosure, an electronic device is provided. The electronic device may include a microphone. The electronic device may include a speaker. The electronic device may include a communication circuit. The electronic device may include at least one processor. The at least one processor may be configured to obtain a second signal based on decoding a first signal received through the communication circuit from an external electronic device. The at least one processor may be configured to output a third signal through the speaker obtained based on executing decompression for the second signal. In response to obtaining an input signal including the output third signal through the microphone, the at least one processor may be configured to compensate the second signal based on a difference between the second signal and the third signal representing a distortion of the third signal. The at least one processor may be configured to execute cancellation of an echo of the input signal based on the compensated second signal.

According to an example embodiment of the disclosure, a method performed by an electronic device is provided. The method may include obtaining a second signal based on decoding a first signal received through a communication circuit from an external electronic device. The method may include outputting a third signal through a speaker of the electronic device obtained based on executing decompression for the second signal. The method may include compensating the second signal based on a difference between the second signal and the third signal representing a distortion of the third signal, in response to obtaining an input signal including the output third signal through a microphone of the electronic device. The method may include executing cancellation of an echo of the input signal based on the compensated second signal.

According to an example embodiment of the disclosure, an electronic device is provided. The electronic device may include a microphone. The electronic device may include a speaker. The electronic device may include a communication circuit. The electronic device may include at least one processor. The at least one processor may be configured to obtain a second signal based on decoding a first signal received through the communication circuit form an external electronic device. The at least one processor may be configured to obtain a third signal in which a reference signal is added to the second signal. The at least one processor may be configured to output a fourth signal through the speaker obtained based on executing decompression for the third signal. In response to obtaining an input signal including the output fourth signal through the microphone, the at least one processor may be configured to detect a distortion of the reference signal included in the input signal.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

The terms used in the present disclosure are used to describe various example embodiments, and are not be intended to limit the scope the disclosure. Singular expressions may include plural expressions unless the context clearly indicates otherwise. The terms used herein, including technical or scientific terms, may have the same meaning as commonly understood by those having ordinary knowledge in the art which the present disclosure describes. Among the terms used in the present disclosure, terms defined in a general dictionary may be interpreted as having the same or similar meaning as those in the context of the related art, and are not interpreted in an ideal or excessively formal meaning unless clearly defined in the present disclosure. In some cases, even terms defined in the present disclosure cannot be interpreted to exclude embodiments of the present disclosure.

In various embodiments of the present disclosure described below, a hardware access method will be described as an example. However, since various embodiments of the present disclosure include art using both hardware and software, various embodiments of the present disclosure do not exclude a software-based access method.

In the following description, terms referring to the configuration of the device (e.g., processor, module, decoder, encoder, compressor and decompressor (Codec), amplifier, preprocessing solution, or post processing solution), terms referring to computation states (e.g., step, operation, or procedure), terms referring to signals (e.g., signal, information, data, stream, or input), and terms referring to data (e.g., parameter or value) are used by way of example for convenience of description. Accordingly, the present disclosure is not limited to the terms described below, and other terms having equivalent technical meaning may be used.

In addition, in the present disclosure, an expression of greater than or less than may be used to determine whether a specific condition is satisfied or fulfilled, but this is simply a description for expressing an example and does not exclude more or less description. Conditions described as "greater than or equal" may be replaced with "greater than", conditions described as "less than or equal" may be replaced with "less than", and conditions described as "greater than or equal and less than" may be replaced with "greater than and less than or equal". In addition, hereinafter, 'A' to 'B' may refer, for example, to at least one of the elements from A (including A) to B (including B).

Figure 1:
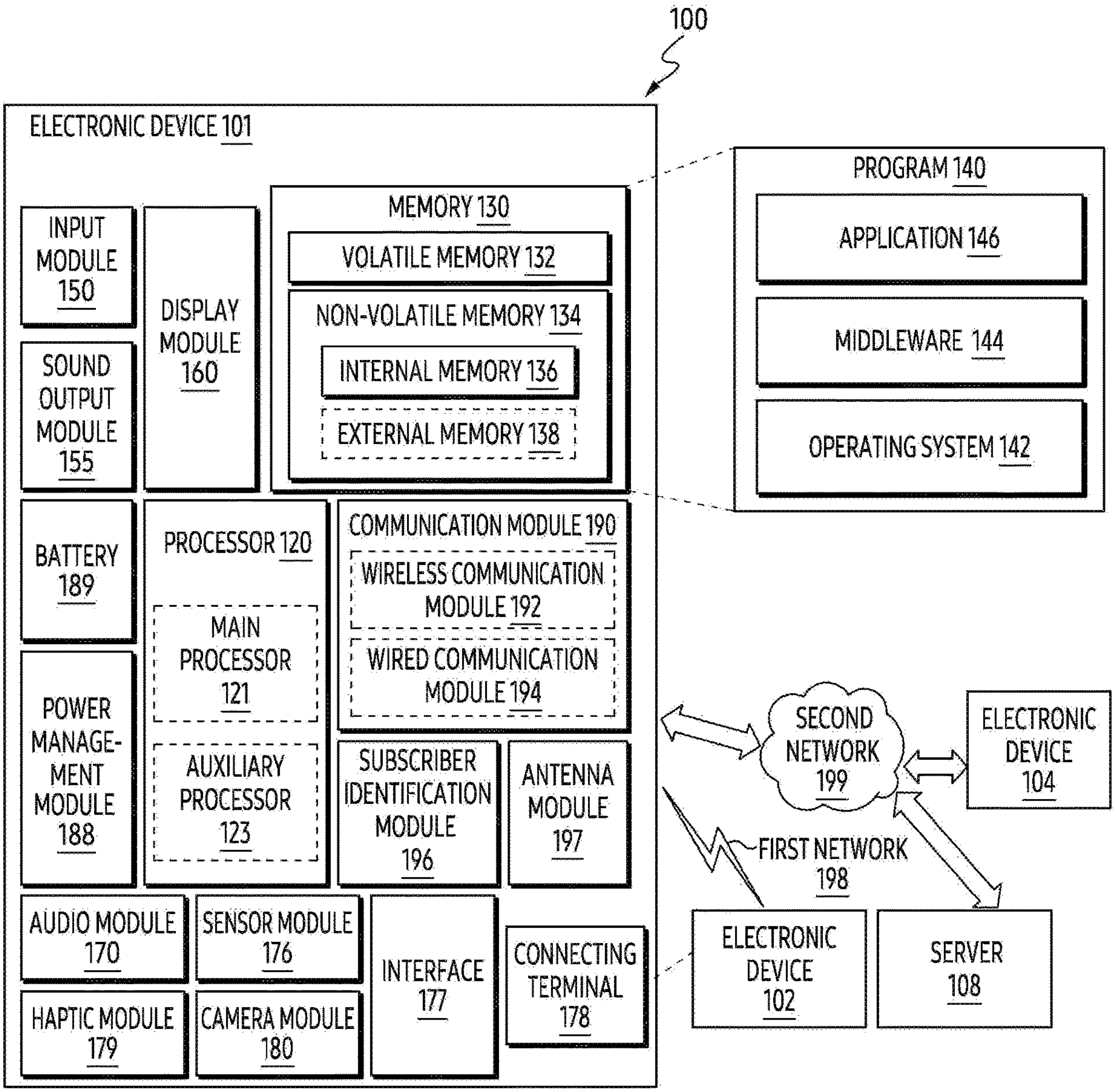
FIG. 1 is a block diagram illustrating an example electronic device in a network environment according to various embodiments.
Figure 2:
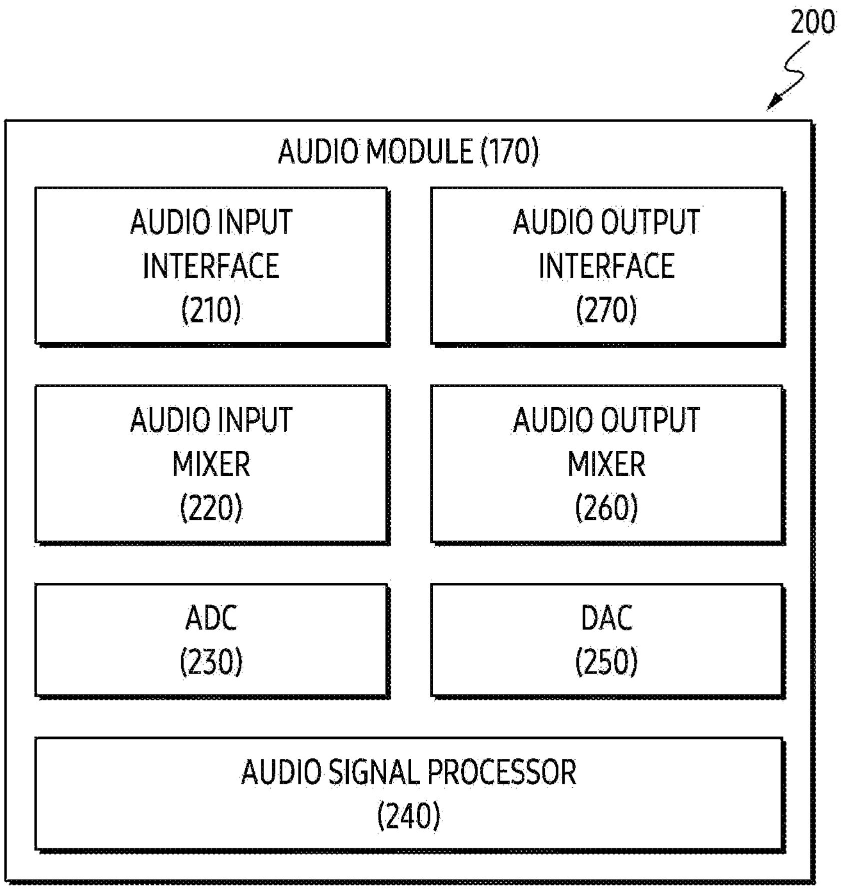
FIG. 2 is a block diagram illustrating an example configuration of an audio module according to various embodiments.

FIG. 1 is a block diagram illustrating an example electronic device 101 in a network environment 100 according to various embodiments. FIG. 2 is a block diagram illustrating an example configuration of an audio module according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2 is a block diagram 200 illustrating an example configuration the audio module 170 according to various embodiments. Referring to FIG. 2, the audio module 170 may include, for example, an audio input interface (e.g., including interface circuitry) 210, an audio input mixer 220, an analog-to-digital converter (ADC) 230, an audio signal processor (e.g., including processing circuitry) 240, a digital-to-analog converter (DAC) 250, an audio output mixer 260, or an audio output interface (e.g., including interface circuitry) 270.

The audio input interface 210 may include various interface circuitry and receive an audio signal corresponding to a sound obtained from the outside of the electronic device 101 via a microphone (e.g., a dynamic microphone, a condenser microphone, or a piezo microphone) that is configured as part of the input module 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of input audio signals into at least one audio signal. For example, according to an embodiment, the audio input mixer 220 may synthesize a plurality of analog audio signals input via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may include various processing circuitry and perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor (120) or the memory (130)) of the electronic device 101 into an analog audio signal.

The audio output mixer 260 may synthesize a plurality of audio signals, which are to be output, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may include various interface circuitry and output an analog audio signal converted by the DAC 250 or, additionally or alternatively, an analog audio signal synthesized by the audio output mixer 260 to the outside of the electronic device 101 via the sound output module 155. The sound output module 155 may include, for example, a speaker, such as a dynamic driver or a balanced armature driver, or a receiver. According to an embodiment, the sound output module 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal input via the audio input interface 210 or an audio signal that is to be output via the audio output interface 270. According to an embodiment, the audio amplifier may be configured as a module separate from the audio module 170.

The electronic device according to various embodiments disclosed in the present disclosure may be various types of devices. The electronic device may include, for example, a portable communication device (e.g., a smartphone), a computer device, a portable multimedia device, a portable medical device, a camera, a wearable device, or a home appliance. The electronic device according to an embodiment of the present disclosure is not limited to the above-described devices.

The various embodiments and terms used herein are not intended to limit the technical features described herein to specific embodiments and should be understood to include various modifications, equivalents, or substitutes of the embodiment. With respect to the description of the drawings, similar reference numerals may be used for similar or related components. The singular form of the noun corresponding to the item may include one or more of the items unless clearly indicated differently in a related context. In this disclosure, each of the phrases such as "A or B", "at least one of A and B", "at least one of A, B and C", "at least one of A, B, or C", and "at least one of A, B, or C" may include any one of the phrases together, or all possible combinations thereof. Terms such as "first", "second", or "second", or "second" may be used simply to distinguish a corresponding component from another corresponding component, and are not limited to other aspects (e.g., importance or order). When some (e.g., the first) component is referred to as "coupled" or "connected" in another (e.g., the second) component, with or without the term "functional" or "communicatively", some of the components can be connected directly (e.g., wired), wirelessly, or through a third component.

The term "module" used in various embodiments of the present disclosure may include a unit implemented in hardware, software, or firmware, or any combination thereof, and be used interchangeably with terms such as logic, logic block, component, or circuitry, for example. The module may be a minimum unit or a part of the integrally configured component or the component that performs one or more functions. For example, according to an embodiment, the module may be implemented in the form of an application-specific integrated circuit (ASIC).

Various embodiments of the present disclosure may be implemented as software (e.g., a program) including one or more instructions stored in a storage medium (or external memory) readable by a device (e.g., the electronic device 101). For example, a processor (e.g., a processor) of a device (e.g., the electronic device 101) may call and execute at least one of the one or more instructions stored from a storage medium. This makes it possible for the device to operate to perform at least one function according to at least one command called. The one or more instructions may include code generated by a compiler or code that may be executed by an interpreter. The device-readable storage medium may be provided in the form of a non-transitory storage medium. Here, the 'non-transitory' storage medium is a device that is tangible and may not include a signal (e.g., electromagnetic wave), and the term does not distinguish between a case where data is semi-permanently stored and a case where it is temporarily stored.

According to an embodiment, a method according to various embodiments disclosed in the present disclosure may be provided by being included in a computer program product. The computer program products may be traded between sellers and buyers as products. The computer program products may be distributed in the form of device-readable storage media (e.g., compact disc read only memory (CD-ROM), or distributed (e.g., downloaded or uploaded) directly or online through an application store (e.g., Play Store™) or between two user devices (e.g., smartphones). In the case of online distribution, at least some of the computer program products may be temporarily stored or temporarily created on a device-readable storage medium such as a manufacturer's server, a server in an application store, or a memory in a relay server.

According to various embodiments, each of the above-described components (e.g., a module or a program) may include a single object or a plurality of objects, and some of the plurality of objects may be separated and disposed in other components. According to various embodiments, one or more components or operations of the above-described corresponding components may be omitted, or one or more other components or operations may be added. Alternatively, or additionally, a plurality of components (e.g., modules or programs) may be integrated into one component. In this case, the integrated component may perform one or more functions of each of the components in the same or similar manner as those performed by the corresponding component among the plurality of components before the integration. According to various embodiments, operations performed by a module, a program, or other components may be executed sequentially, in parallel, repeatedly, or heuristic, performed in a different order, omitted, or one or more other operations may be added.

In case that a user uses a service such as a voice call, an electronic device may receive a digital signal from an external electronic device and may decode the received digital signal. After the signal received from the external electronic device is decoded, a signal output to a speaker of the electronic device may be referred to as a far-end signal. The signal in which the signal received from the external electronic device is decoded may be output through a sound output device (e.g., a speaker) after converting various processing into an analog signal. At this time, the signal output from the sound output device may be input back through a microphone of the electronic device. Herein, the signal input back to the microphone may be referred to as a near-end signal. As the signal output to the sound output device is input back through the microphone of the electronic device, an echo may occur. In case that an echo occurs, a call quality may be degraded, and thus a technology for cancelling the echo may be applied.

In general, an electronic device may include an echo canceller comprising various circuitry and/or executable program instructions for cancelling an echo. The echo canceller may be implemented through hardware, software, or a combination of hardware and software. The electronic device may cancel the echo by comparing the far-end signal and the near-end signal through the echo canceller. An example of an electronic device for cancelling an echo is illustrated and described in greater detail below with reference to FIG. 3.

Figure 3:
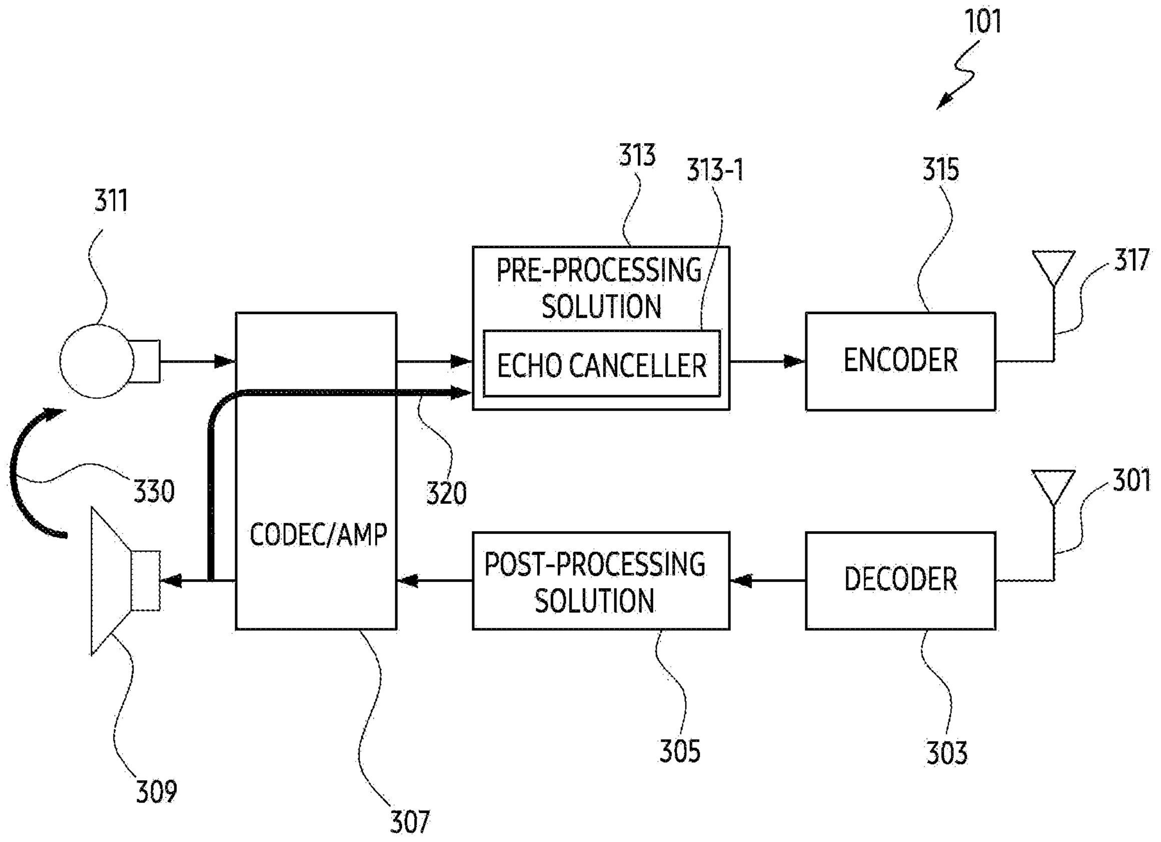
FIG. 3 is a diagram illustrating an example of an electronic device for cancelling an echo according to various embodiments.

FIG. 3 is a diagram illustrating an example of an electronic device for cancelling an echo according to various embodiments. Herein, the echo may be generated when a signal received from an external electronic device is output through a sound output device of the electronic device and flows back into a microphone.

Referring to FIG. 3, an electronic device 101 may include a receiving antenna 301, a decoder 303, a post-processing solution (e.g., including various circuitry and/or executable program instructions) 305, a compressor and decompressor (codec)/amplifier (amp) 307, a sound output device 309 (hereinafter, referred to as a speaker), a microphone 311, a pre-processing solution (e.g., including various circuitry and/or executable program instructions) 313, an encoder 315, and/or a transmitting antenna 317. FIG. 3 shows the electronic device 101 including one receiving antenna 301, one transmitting antenna 317, one sound output device 309, and one microphone 311 (hereinafter, referred to as a microphone), but is not limited thereto. The description of FIG. 3 may also be applied to an electronic device including a plurality of receiving antennas, a plurality of transmitting antennas, a plurality of sound output devices, or a plurality of microphones. For example, the receiving antenna 301 and the transmitting antenna 317 may be separate antennas or may be one antenna.

A processing process of outputting a received digital signal through the speaker 309 is as follows. The receiving antenna 301 of the electronic device 101 may receive a signal from an external electronic device (not shown). The signal received herein may be a digital signal. The digital signal received through the receiving antenna 301 may be decoded through the decoder 303. The digital signal decoded through the decoder 303 may be input to the post-processing solution 305. The post-processing solution 305 may include a configuration for improving sound quality, adjusting sound volume, or cancelling noise. For example, the post-processing solution 305 may include a filter. The post-processing solution 305 may be controlled by at least one processor (not shown). The at least one processor may include an application processor (AP) or a communication processor (CP). The digital signal processed by the post-processing solution 305 may be amplified in the codec/amplifier 307 and may be converted into an analog signal. The converted analog signal may be output (or played) through the speaker 309.

An output process of transmitting an analog signal input to the microphone 311 is as follows. At this time, for example, the analog signal input to the microphone 311 may include an analog signal output from the speaker 309. For example, the analog signal input to the microphone 311 may include a voice signal received from a user. For convenience of description, the analog signal output from the speaker 309 will be described as an example. The analog signal input to the microphone 311 may be converted back to a digital signal by passing the codec/amplifier 307 and may be amplified. The converted digital signal may be input to the pre-processing solution 313. The pre-processing solution 313 may include a configuration for improving sound quality, adjusting sound volume, or cancelling noise. For example, the pre-processing solution 313 may include a filter. The pre-processing solution 313 may include a configuration for cancelling an echo (e.g., an echo canceller 313-1). At this time, the pre-processing solution 313 may be controlled by at least one processor (not shown). The at least one processor may include an application processor (AP) or a communication processor (CP). The digital signal that has passed the pre-processing solution 313 may be encoded in the encoder 315. The electronic device 101 may transmit the encoded digital signal to the outside (or to the external electronic device) through the transmitting antenna 317.

As described above, in case that a user of the electronic device 101 makes a call with another user of the external electronic device, a signal 320 received from the external electronic device may be output through the speaker 309, and an output signal 330 may be input to the microphone 311 of the electronic device 101. Accordingly, the signal received through the receiving antenna 301 may be output through the speaker 309 and may be input back through the microphone 311, so that an echo may be generated. The electronic device 101 may cancel the echo through an echo canceller. In general, the electronic device may cancel the echo by comparing the signal 320 and the signal 330. However, when an error occurs in the signal 320, the echo canceller of the electronic device 101 may not operate smoothly, and the echo may not be completely cancelled. Herein, the error of a signal may refer, for example, to a case in which a distortion or mute occurs in the signal. Alternatively, the electronic device 101 may obtain information on the signal 320 through an internal path of the electronic device 101 to cancel the echo. At this time, in case that a path for obtaining information on the signal 320 is incorrectly set or not set, the electronic device 101 may identify as that an error has occurred in the signal 320. For example, during a call setup, the electronic device 101 may set a reception path, a transmission path, and a path for obtaining information on the signal 320 for a call. At this time, according to the driving of a component (e.g., the processor 120 of FIG. 1) and/or a software application included in the electronic device 101, a path for obtaining information on the signal 320 may not be set, or a path in which noise is formed may be set.

Hereinafter, in various embodiments of the present disclosure, a device and method for more effectively cancelling an echo by detecting an error in a far-end signal as described above (hereinafter, referred to as a device and method for detecting error of a signal) are proposed. In addition, in case that an error of a signal is detected, the device and method for detecting an error of a signal according to an embodiment of the present disclosure may smoothly cancel the echo by performing processing to compensate the error. The device and method for detecting an error of a signal according to an embodiment of the present disclosure may detect an error of a signal using as small resources as possible. Accordingly, the device and method for detecting an error of a signal according to an embodiment of the present disclosure may provide a user with an opportunity to perform a high-quality voice call.

Figure 4:
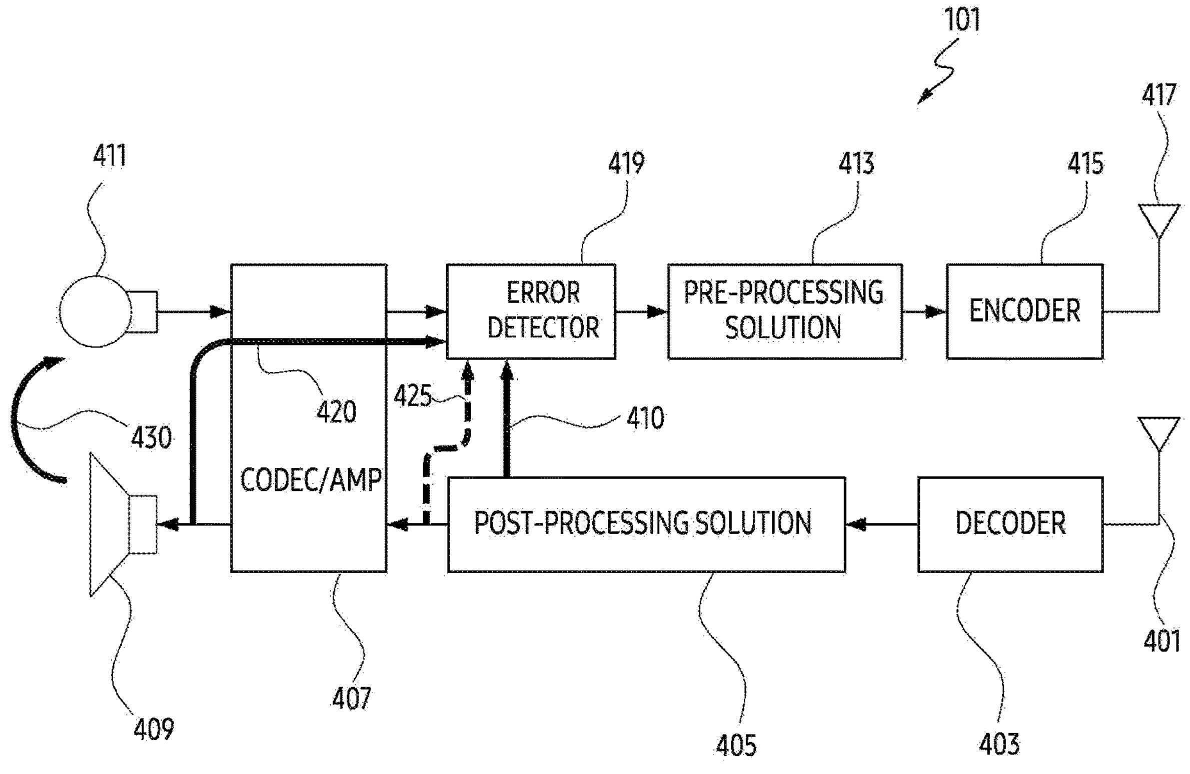
FIG. 4 is a diagram illustrating an example of an electronic device for detecting and compensating an error of a signal for cancellation of an echo according to various embodiments.

FIG. 4 is a diagram illustrating an example of an electronic device for detecting and compensating an error of a signal for cancellation of an echo according to various embodiments. Herein, the echo may be generated when a signal received from an external electronic device is output through a sound output device of the electronic device and flows back into a microphone. Herein, the error of the signal may include, for example, a case in which a distortion or mute occurs in the signal. In addition, in case that a path for obtaining information on the signal is incorrectly set or not set, the electronic device may identify as that an error of the signal has occurred. For example, during a call setup, the electronic device 101 may set a reception path, a transmission path, and a path for obtaining information on the signal for a call. At this time, according to the driving of a component (e.g., the processor 120 of FIG. 1) and/or a software application included in the electronic device 101, a path for obtaining information on the signal may not be set, or a path in which noise is formed may be set.

The electronic device 101 of FIG. 4 may be understood substantially the same as or similar to the electronic device 101 of FIG. 1. In addition, the electronic device 101 of FIG. 4 may include the audio module 170 shown in the block diagram 200 of FIG. 2.

Referring to FIG. 4, an electronic device 101 may include a receiving antenna 401, a decoder 403, a post-processing solution (e.g., including various processing circuitry and/or executable program instructions) 405, a compressor and decompressor (codec)/amplifier (amp) 407, a sound output device 409 (e.g., a speaker), a microphone 411, a pre-processing solution (e.g., including various processing circuitry and/or executable program instructions) 413, an encoder 415, and/or a transmitting antenna 417. FIG. 4 shows the electronic device 101 including one receiving antenna 401, one transmitting antenna 417, one sound output device 409, and one microphone 411 (hereinafter, referred to as a microphone), but is not limited thereto. A device and method for detecting an error of a signal according to embodiments of the present disclosure may include a plurality of sound output devices 409 or a plurality of microphones 411. Details associated with this will be described in greater detail below with reference to FIG. 6. For example, the receiving antenna 401 and the transmitting antenna 417 may be separate antennas or may be one antenna.

A processing process of outputting a received digital signal through the speaker 409 is as follows. The receiving antenna 401 of the electronic device 101 may receive a signal from an external electronic device (not shown). For example, the received signal may be a digital signal. The digital signal received through the receiving antenna 401 may be decoded through the decoder 403. The digital signal decoded through the decoder 403 may be input to the post-processing solution 405. The post-processing solution 405 may include a configuration for improving sound quality, adjusting sound volume, or cancelling noise. For example, the post-processing solution 405 may include a filter. At this time, the post-processing solution 405 may be controlled by at least one processor (not shown). The at least one processor may include, for example, an application processor (AP) or a communication processor (CP). The digital signal processed by the post-processing solution 405 may be amplified in the codec/amplifier 407 and may be converted into an analog signal. The converted analog signal may be output (or played) through the speaker 409.

An output process of transmitting an analog signal input to the microphone 411 is as follows. At this time, for example, the analog signal input to the microphone 411 may include an analog signal output from the speaker 409. For example, the analog signal input to the microphone 411 may include a voice signal received from a user. For convenience of description, the analog signal output from the speaker 409 will be described as an example. The analog signal input to the microphone 411 may be converted back to a digital signal by passing the codec/amplifier 407 and may be amplified. The converted digital signal may be input to the pre-processing solution 413. The pre-processing solution 413 may include a configuration for improving sound quality, adjusting sound volume, or cancelling noise. For example, the pre-processing solution 413 may include a filter. The pre-processing solution 413 may include a configuration for cancelling an echo (e.g., an echo canceller). At this time, the pre-processing solution 413 may be controlled by at least one processor (not shown). The at least one processor may include, for example, an application processor (AP) or a communication processor (CP). The digital signal that has passed the pre-processing solution 413 may be encoded in the encoder 415. The electronic device 101 may transmit the encoded digital signal to the outside (or to the external electronic device) through the transmitting antenna 417.

According to an embodiment, the electronic device 101 may include an error detector (e.g., including various processing circuitry and/or executable program instructions) 419. For example, the error detector 419 may include a device or a configuration for detecting an error of a signal. In an embodiment, the error detector 419 may detect whether an error of a signal 420 for the operation of the echo canceller (not shown) occurs. Hereinafter, for convenience of description, the signal 420 is referred to as an analog received reference signal (Rx reference signal). The echo canceller may cancel the echo by comparing the analog received reference signal 420 and a signal 430 input to the microphone 411. Hereinafter, the signal 430 will be referred to as an input signal. Accordingly, the electronic device 101 may better cancel the echo only when an error does not occur in the analog received reference signal 420.

According to an embodiment, in order to detect whether an error has occurred in the analog received reference signal 420, the error detector 419 may obtain information on the analog received reference signal 420 and may obtain information on a reception signal 410. Herein, the reception signal 410 may be, for example, a signal in which a digital signal received through the receiving antenna 401 is decoded by a decoder 403 and processed by a post-processing solution 405. In an embodiment, the error detector 419 may detect an error of the analog received reference signal 420 by comparing the received reference signal 420 and the reception signal 410. For example, the error detector 419 may convert the analog received reference signal 420 into a digital signal and may detect an error through convolution and the reception signal 410 which is a digital signal. The error detector 419 may convert the reception signal 410, which is a digital signal, into an analog signal and may detect an error through the convolution and the analog received reference signal 420. Alternatively, the error detector 419 may detect an error by performing the convolution a digital received reference signal 425 and the reception signal 410, which is a digital signal, as will be described below.

In an embodiment, in case that an error of the analog received reference signal 420 is detected through the error detector 419, the electronic device 101 may cancel an echo using the reception signal 410 instead of the analog received reference signal 420.

According to an embodiment, an echo canceller may cancel an echo by comparing the digital received reference signal 425 and the signal 430 input to the microphone 411 instead of the analog received reference signal 420. The digital received reference signal 425 may be a reception signal 410 that has passed the post-processing solution 405. For example, the digital received reference signal 425 may be a reception signal 410 in which sound quality is improved, sound volume is adjusted, or noise is cancelled by passing the post-processing solution 405. The digital received reference signal 425 may be a signal before the reception signal 410 is input to a codec/amplifier 407. According to an embodiment, the digital received reference signal 425 may include a digital signal before signal processed in the post-processing solution 405 and the codec/amplifier 407 and converted into an analog signal by the codec/amplifier 407.

According to an embodiment, the analog received reference signal 420 may be a reception signal 410 that has passed the post-processing solution 405 and the codec/amplifier 407. At this time, the analog received reference signal 420 may be converted into an analog signal through the codec/amplifier 407. For example, the analog received reference signal 420 or the digital received reference signal 425 may include the same content as the reception signal 410.

According to an embodiment, in case that an error occurs in the analog received reference signal 420 or the digital received reference signal 425, the electronic device 101 may cancel an echo based on the reception signal 410. For example, in a case of the digital received reference signal 425 (or a reception signal 410 that has passed only the post-processing solution 405), the electronic device 101 may cancel the echo using the reception signal 410. For example, the echo canceller may cancel the echo using the reception signal 410. In contrast, in a case of an analog received reference signal 420, the electronic device 101 may cancel the echo using the reception signal 410 compensated through a gain and filtering. For example, the electronic device 101 may cancel the echo by converting a signal 430 input through the microphone 411 into a digital signal through the codec/amplifier 407 and comparing with the compensated reception signal 410, which is a digital signal. In an embodiment, the echo canceller may cancel the echo using a reception signal 410 corrected similar to the analog received reference signal 420 that would have been processed and output through the codec/amplifier 407 in a case of no distortion.

According to an embodiment, the electronic device 101 may detect an error of the analog received reference signal 420 by comparing the reception signal 410 and the analog received reference signal 420. For example, in case that an error occurs in the analog received reference signal 420, the electronic device 101 may compensate the reception signal 410. Accordingly, the electronic device 101 may cancel the echo by comparing the input signal 430 with the compensated reception signal 410 instead of the analog received reference signal 420. For example, the electronic device 101 may cancel the echo by comparing the compensated reception signal 410 and the input signal 430 converted into a digital signal through the codec/amplifier 407. In case that an error of the analog received reference signal 420 is detected, the device and method for detecting an error of a signal according to an embodiment of the present disclosure may smoothly cancel the echo by performing processing of compensating the error. Alternatively, in case that an error occurs in the digital received reference signal 425, the electronic device 101 may not compensate the reception signal 410. This is because the digital received reference signal 425 in which the error is detected is a front-end signal of the codec/amplifier 407, and the received reference signal 425 and the reception signal 410 are substantially the same. Accordingly, the electronic device 101 may cancel the echo by comparing the input signal 430 through the reception signal 410. Accordingly, the device and method for detecting an error of a signal according to an embodiment of the present disclosure may provide a user with an opportunity to perform a high-quality voice call.

Figure 5:
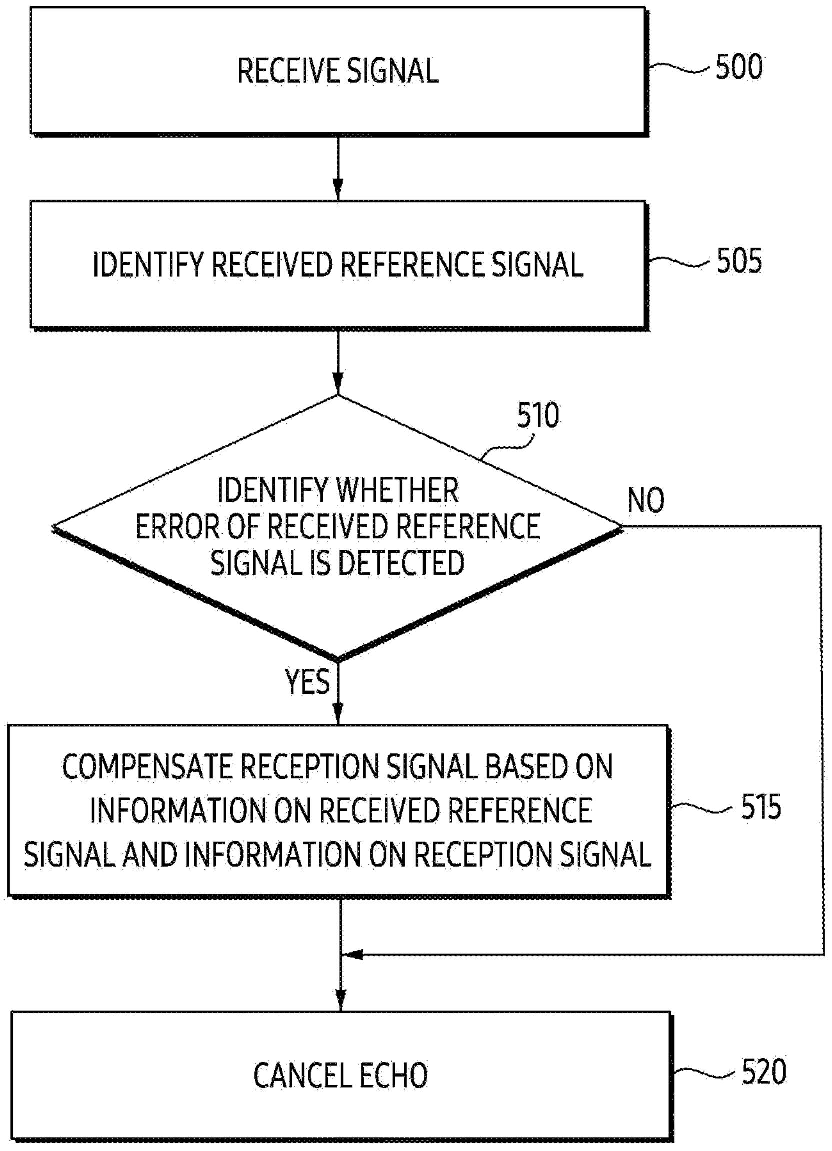
FIG. 5 is a flowchart illustrating an example method for detecting and compensating an error of a signal for cancellation of an echo according to various embodiments.

FIG. 5 is a flowchart illustrating an example method for detecting and compensating an error of a signal for cancellation of an echo according to various embodiments. Herein, the echo may be generated when a signal received from an external electronic device is output through a sound output device of an electronic device and flows back into a microphone. Herein, the error of the signal may include a case in which a distortion or mute occurs in the signal. In addition, in case that a path for obtaining information on the signal is incorrectly set or not set, the electronic device may identify as that an error of the signal has occurred. For example, during a call setup, the electronic device 101 may set a reception path, a transmission path, and a path for obtaining information on the signal for a call. At this time, according to the driving of a component (e.g., the processor 120 of FIG. 1) and/or a software application included in the electronic device 101, a path for obtaining information on the signal may not be set, or a path in which noise is formed may be set.

A method for detecting and compensating an error of a signal illustrated by way of non-limiting example in FIG. 5 may be performed by the electronic device 101 of FIG. 4.

Referring to FIG. 5, in operation 500, an electronic device may receive a signal. Herein, the signal may include an external electronic device or a digital signal received from the outside. In addition, the signal may be referred to as a reception signal.

In operation 505, the electronic device may identify a received reference signal. According to an embodiment, the received reference signal may be a reception signal processed by a post-processing solution. For example, the received reference signal may be a reception signal in which sound quality is improved, sound volume is adjusted, or noise is cancelled by passing the post-processing solution. The received reference signal may be referred to as a digital received reference signal. According to an embodiment, the received reference signal may be a reception signal that has passed the post-processing solution and a codec/amplifier. The received reference signal may be referred to as an analog received reference signal. The received reference signal may be a signal including the same content as the reception signal.

In operation 510, the electronic device may identify whether an error of the received reference signal is detected. The electronic device may detect an error of the received reference signal by comparing the received reference signal and the reception signal through an error detector. In operations 500 and 505, the electronic device may obtain information on the reception signal and information on the received reference signal. The electronic device may identify that an error of the received reference signal has occurred based on information on the received reference signal and information on the reception signal. For example, the error detector may detect an error by converting the reception signal, which is an analog signal, into a digital signal and comparing a threshold value and a result of convolution of the reception signal, which is the digital signal. The error detector may detect an error by converting the reception signal, which is a digital signal, into an analog signal and comparing a threshold value and a result of convolution of the received reference signal, which is an analog signal. The error detector may detect an error by comparing a threshold and a result of convolution of the received reference signal, which is a digital signal and the reception signal, which is a digital signal, as will be described below. For example, information on the reception signal may include a frequency for each band, a gain and/or degree of delay of the reception signal. For example, information on the received reference signal may include a degree of frequency, gain, and/or delay for each band of the received reference signal. For example, an error of the received reference signal may include a case in which a distortion occurs or a mute occurs in the received reference signal. In addition, in case that a path for obtaining information on the received reference signal is incorrectly set or not set, the electronic device may identify as that an error of the received reference signal has occurred.

In operation 510, in case that the electronic device identifies that an error has been detected in the received reference signal, the electronic device may perform operation 515. In case that the electronic device does not identify that an error has been detected in the received reference signal, in operation 520, the electronic device may execute the cancellation of an echo.

In operation 515, the electronic device may compensate the reception signal based on information on the reception signal and information on the received reference signal. In case that an error of the received reference signal is detected, the electronic device may compensate the reception signal to correspond to the received reference signal based on a difference between the information on the reception signal and the information on the received reference signal. This may be to generate a signal required to cancel the echo. However, in case that the received reference signal is a signal at the front end of the codec/amplifier (or a digital received reference signal that has passed only the post-processing solution) and has substantially the same level as the reception signal, the operation 515 may be omitted.

In operation 520, the electronic device may cancel the echo. The electronic device may cancel the echo based on the compensated reception signal or the reception signal. In a case of cancelling the echo based on the compensated reception signal, it may represent a case where the received reference signal is an analog received reference signal. In a case of cancelling the echo based on the reception signal, it may represent a case where the received reference signal is a digital received reference signal. The electronic device may cancel the echo by comparing the compensated reception signal (or reception signal) with an input signal. Herein, the input signal may refer, for example, to a signal in which a signal output through a sound output device of the electronic device is re-input through a microphone. According to an embodiment, after operation 505, the electronic device may output a received reference signal through a speaker and obtain the output signal through a microphone.

Although not shown in FIG. 5, before performing operation 500, the electronic device may perform a connection for a voice call with an external electronic device. For example, a user of the electronic device may perform a voice call with a user of the external electronic device. In addition, in case that an error of the received reference signal is detected, the electronic device may store information on the detected error of the received reference signal. In addition, in case that an error of the received reference signal is detected, the electronic device may notify the user that an error of the received reference signal has occurred.

As described above, in case that an error of the received reference signal is detected, the device and method for detecting an error of a signal according to an embodiment of the present disclosure may smoothly cancel an echo by performing a processing of compensating the reception signal. Accordingly, the device and method for detecting an error of a signal according to an embodiment of the present disclosure may provide a user with an opportunity to perform a high-quality voice call.

Figure 6:
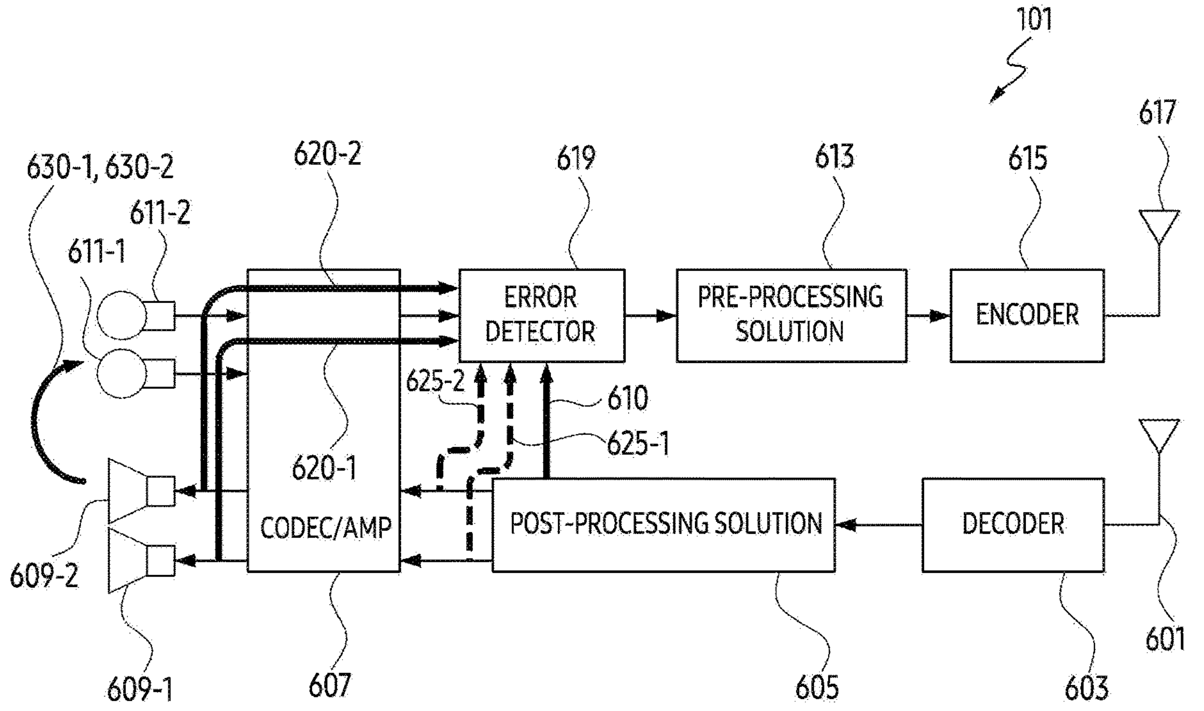
FIG. 6 is a diagram illustrating an example of an electronic device for detecting and compensating an error of a signal for cancellation of an echo according to various embodiments.

FIG. 6 is a diagram illustrating an example of an electronic device for detecting and compensating an error of a signal for cancellation of an echo according to various embodiments. For example, the echo may be generated when a signal received from an external electronic device is output through a sound output device of the electronic device and flows back into a microphone. For example, the error of the signal may include a case in which a distortion or mute occurs in the signal. In addition, in case that a path for obtaining information on the signal is incorrectly set or not set, an electronic device 101 may identify as that an error of the signal has occurred. The electronic device 101 of FIG. 6 may be understood substantially the same as the electronic device 101 of FIG. 1. In addition, the electronic device 101 of FIG. 6 may include the audio module 170 shown in the block diagram 200 of FIG. 2.

Referring to FIG. 6, an electronic device 101 may include a receiving antenna 601, a decoder 603, a post-processing solution (e.g., including various processing circuitry and/or executable program instructions) 605, a compressor and decompressor (codec)/amplifier (amp) 607, a plurality of sound output devices 609-1 and 609-2 (hereinafter, referred to as speakers), a plurality of microphones 611-1 and 611-2

(hereinafter, referred to as microphones), a pre-processing solution (e.g., including various processing circuitry and/or executable program instructions) 613, an encoder 615, and/or a transmitting antenna 617. FIG. 6 shows the electronic device 101 including a receiving antenna 601 and a transmitting antenna 617, but the present disclosure is not limited thereto. A device and method for detecting an error of a signal according to embodiments of the present disclosure may include a plurality of receiving antennas 601 or a plurality of transmitting antennas 617. For example, the receiving antenna 601 and the transmitting antenna 617 may be separate antennas or may be one antenna.

A processing process of outputting a received digital signal through the speaker 609 is as follows. The receiving antenna 601 of the electronic device 101 may receive a signal from an external electronic device (not shown). For example, the received signal may be a digital signal. The digital signal received through the receiving antenna 601 may be decoded through the decoder 603. The digital signal decoded through the decoder 603 may be input to the post-processing solution 605. The post-processing solution 605 may include a configuration for improving sound quality, adjusting sound volume, or cancelling noise. For example, the post-processing solution 605 may include a filter. At this time, the post-processing solution 605 may be controlled by at least one processor (not shown). The at least one processor may include an application processor (AP) or a communication processor (CP). The digital signal processed by the post-processing solution 605 may be amplified in the codec/amplifier 607 and may be converted into an analog signal. According to an embodiment, the analog signal converted by passing the codec/amplifier 607 may be input to the plurality of speakers 609-1 and 609-2 through a plurality of output paths. The plurality of output paths may correspond to the plurality of speakers 609-1 and 609-2. The analog signals input to the speakers 609-1 and 609-2 may be output (or played) through the speakers 609-1 and 609-2. FIG. 6 shows the electronic device 101 including two speakers 609-1 and 609-2, but the present disclosure is not limited thereto. For example, the electronic device 101 of the present disclosure may include three or more speakers.

An output process of transmitting analog signals 630-1 and 630-2 input to the microphones 611-1 and 611-2 is as follows. For example, the analog signals 630-1 and 630-2 input to the microphones 611-1 and 611-2 may include an analog signal output from the speaker 609. For example, the analog signals 630-1 and 630-2 input to the microphones 611-1 and 611-2 may include a voice signal received from a user. For convenience of description, the analog signals output from the speakers 609-1 and 609-2 will be described as an example. FIG. 6 shows the electronic device 101 including two microphones 611-1 and 611-2, but the present disclosure is not limited thereto. For example, the electronic device 101 of the present disclosure may include three or more microphones. The analog signals 630-1 and 630-2 input to the microphones 611-1 and 611-2 may be converted back to a digital signal by passing the codec/amplifier 607 and may be amplified. The converted digital signal may be input to the pre-processing solution 613. The pre-processing solution 613 may include a configuration for improving sound quality, adjusting sound volume, or cancelling noise. The pre-processing solution 613 may include a configuration for cancelling an echo (e.g., an echo canceller). For example, the pre-processing solution 613 may include a filter. At this time, the pre-processing solution 613 may be controlled by at least one processor (not shown). The at least one processor may include an application processor (AP) or a communication processor (CP). The digital signal that has passed the pre-processing solution 613 may be encoded in the encoder 615. The electronic device 101 may transmit the encoded digital signal to the outside (or to the external electronic device) through the transmitting antenna 617.

According to an embodiment, the electronic device 101 may include an error detector 619. For example, the error detector 619 may include a device or a configuration for detecting an error of a signal. The error detector 619 may detect whether an error of signals 620-1 and 620-2 for the operation of the echo canceller (not shown) occurs. Hereinafter, for convenience of description, the signals 620-1 and 620-2 are referred to as analog received reference signals (Rx reference signals). For example, the echo canceller may cancel the echo by comparing the analog received reference signals 620-1 and 620-2 and signals 630-1 and 630-2 input back to the microphones 611-1 and 611-2, respectively. The signals 630-1 and 630-2 may be referred to as input signals. The electronic device 101 may better cancel the echo only when an error does not occur in the analog received reference signals 620-1 and 620-2. In an embodiment, in order to detect whether an error has occurred in the analog received reference signals 620-1 and 620-2, the error detector 619 may obtain information on the analog received reference signals 620-1 and 620-2 and may obtain information on a reception signal 610. For example, the reception signal 610 may be a signal in which a digital signal received through the receiving antenna 601 is decoded by a decoder 603 and processed by a post-processing solution 605. The error detector 619 may detect an error of the analog received reference signals 620-1 and 620-2 by comparing the analog received reference signals 620-1 and 620-2 with the reception signal 610. For example, the error detector 619 may detect errors for each of the analog received reference signals 620-1 and 620-2 by repeatedly comparing the analog received reference signals 620-1 and 620-2 with the reception signal 610, respectively. For example, the electronic device 101 may identify whether an error exists in each of the analog received reference signals 620-1 and 620-2, which are analog signals that may be output through the plurality of speakers 609-1 and 609-2, through the error detector 619. For example, the error for each of the analog received reference signals 620-1 and 620-2 may include a case in which a distortion or mute occurs in the analog received reference signal 620-1 or 620-2. In addition, in case that a path (or an output path) for obtaining information on the analog received reference signal 620-1 or 620-2 is incorrectly set or not set, the electronic device 101 may identify as that an error of the analog received reference signal 620-1 or 620-2 has occurred. In case that an error of the analog received reference signals 620-1 and 620-2 is detected through the error detector 619, the electronic device 101 may cancel the echo using the reception signal 610 instead of the analog received reference signal 620-1 or 620-2 in which the error has occurred.

According to an embodiment, the echo canceller may cancel an echo by comparing digital received reference signals 625-1 and 625-2 with the signals 630-1 and 630-2 input to the microphones 611-1 and 611-2 instead of the analog received reference signals 620-1 and 620-2. The digital received reference signals 625-1 and 625-2 may be a reception signal 610 that has passed the post-processing solution 605. For example, the digital received reference signals 625-1 and 625-2 may be a reception signal 610 in which sound quality is improved, sound volume is adjusted, or noise is cancelled by passing the post-processing solution

605. The digital received reference signals 625-1 and 625-2 may be a signal before the reception signal 610 is input to a codec/amplifier 607.

According to an embodiment, the analog received reference signals 620-1 and 620-2 may be a reception signal 610 that has passed the post-processing solution 605 and the codec/amplifier 607. At this time, the analog received reference signals 620-1 and 620-2 may be converted into an analog signal through the codec/amplifier 607. As described above, the analog received reference signals 620-1 and 620-2 may be signals including the same content as the reception signal 610.

According to an embodiment, in case that an error occurs in the analog received reference signals 620-1 and 620-2 or the digital received reference signals 625-1 and 625-2, the electronic device 101 may cancel an echo based on the reception signal 610. For example, in a case of the digital received reference signals 625-1 and 625-2 (or a reception signal 610 that has passed only the post-processing solution 605), the electronic device 101 may cancel the echo using the reception signal 610. For example, the echo canceller (e.g., included in the pre-processing solution 613) may cancel the echo using the reception signal 610. In contrast, in a case of the analog received reference signals 620-1 and 620-2, the electronic device 101 may cancel the echo using the reception signal 610 compensated through a gain and filtering. For example, the electronic device 101 may cancel the echo by converting the signals 630-1 and 630-2 input through the microphone 611 into digital signals through the codec/amplifier 607 and comparing with the compensated reception signal 610, which is a digital signal. The echo canceller may cancel the echo using a reception signal 610 corrected similar to the analog received reference signals 620-1 and 620-2 that would have been processed and output through the codec/amplifier 607 in a case of no distortion. An error may occur in part or all of the analog received reference signals 620-1 and 620-2.

According to an embodiment, the electronic device 101 may detect an error of the analog received reference signals 620-1 and 620-2 by comparing the reception signal 610 and the analog received reference signals 620-1 and 620-2. For example, in case that an error occurs in at least a part among the analog received reference signals 620-1 and 620-2, the electronic device 101 may compensate the reception signal 610. Accordingly, the electronic device 101 may cancel the echo by comparing the input signals 630-1 and 630-2 with the compensated reception signal 610 instead of the analog received reference signals 620-1 and 620-2. For example, the electronic device 101 may cancel the echo by comparing the compensated reception signal 610 and the input signals 630-1 and 630-2 converted into a digital signal through the codec/amplifier 607. In case that an error of the analog received reference signals 620-1 and 620-2 is detected, the device and method for detecting an error of a signal according to an embodiment of the present disclosure may smoothly cancel the echo by performing processing of compensating the reception signal 610. Alternatively, in case that an error occurs in at least a part among the digital received reference signals 625-1 and 625-2, the electronic device 101 may not compensate the reception signal 610. In case that the analog received reference signal 620-1 or 620-2 in which an error is detected is the digital received reference signals 625-1 or 625-2, the digital received reference signals 625-1 and 625-2 may be substantially the same as the reception signal 610. Accordingly, the electronic device 101 may cancel the echo by comparing the input signals 630-1 and 630-2 with the reception signal 610. Accordingly, the device and method for detecting an error of a signal according to an embodiment of the present disclosure may provide a user with an opportunity to perform a high-quality voice call.

Referring to the examples of FIGS. 4, 5 and 6, the device and method for detecting an error of a signal according to the embodiments of the present disclosure may detect an error by comparing a received signal (e.g., a reception signal) and a signal before being output (e.g., a received reference signal). In case that an error of the signal is detected, the electronic device 101 may compensate the received signal based on a difference identified according to information on the signals. The electronic device 101 may cancel an echo by comparing the compensated signal and a signal (e.g., an input signal) output and received through a microphone. At this time, in order for the electronic device 101 to detect an error of the signal, an amount of computation may be increased to identify information on the signals and whether a difference value thereof is greater than or equal to a threshold value, and a memory that needs to be allocated for information and computation processes may be increased. For example, in a case of an enhanced voice service (EVS) call, it is necessary for the electronic device 101 to store (or dump) information on a signal of about 60 seconds or longer in order to detect an error by comparing the signals. In a case of storing information on a signal having a length of 60 seconds, 11 Mbytes of data may be required. As described above, the electronic device 101 may detect an error of the received reference signal by comparing the signals (e.g., a reception signal and a received reference signal). In addition, the electronic device 101 may compensate the reception signal by the difference identified in the process of comparing the signals. For example, the electronic device 101 of FIGS. 3 to 6 may not only detect an error by comparing the signals but also compensate the reception signal to cancel an echo. In contrast, in case that only an error of the received reference signal is detected, the electronic device 101 may use the resource more efficiently. Hereinafter, in FIGS. 7 to 9B, a device and method for detecting an error of a received reference signal using a reference signal according to embodiments of the present disclosure will be described.

Figure 7:
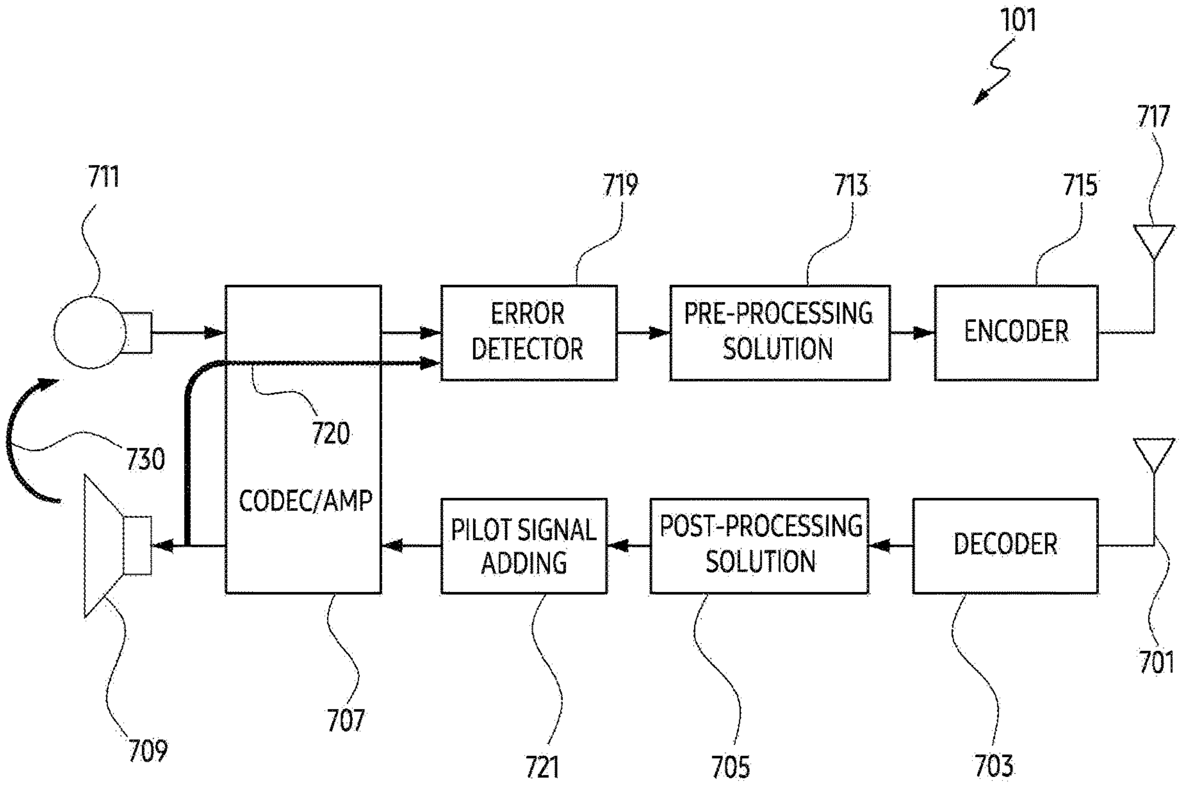
FIG. 7 is a diagram illustrating an example of an electronic device for detecting an error of a signal for cancellation of an echo according to various embodiments.

FIG. 7 is a diagram illustrating an example of an electronic device for detecting an error of a signal for cancellation of an echo according to various embodiments. For example, the echo may be generated when a signal received from an external electronic device is output through a sound output device of an electronic device and flows back into a microphone. For example, the error of the signal may include a case in which a distortion or mute occurs in the signal. In addition, in case that a path for obtaining information on the signal is incorrectly set or not set, the electronic device may identify as that an error of the signal has occurred. An electronic device 101 of FIG. 7 may be understood substantially the same as the electronic device 101 of FIG. 1. In addition, the electronic device 101 of FIG. 7 may include the audio module 170 shown in the block diagram 200 of FIG. 2.

Referring to FIG. 7, an electronic device 101 may include a receiving antenna 701, a decoder 703, a post-processing solution (e.g., including various processing circuitry and/or executable program instructions) 705, a compressor and decompressor (codec)/amplifier (amp) 707, a sound output device 709, a microphone 711, a pre-processing solution (e.g., including various processing circuitry and/or executable program instructions) 713, an encoder 715, and/or a transmitting antenna 717. FIG. 7 shows the electronic device 101 including one receiving antenna 701, one transmitting antenna 717, one sound output device 709, and one microphone 711 (hereinafter, referred to as a microphone), but is not limited thereto. A device and method for detecting an error of a signal according to embodiments of the present disclosure may include a plurality of sound output devices 709 or a plurality of microphones 711. For example, the receiving antenna 701 and the transmitting antenna 717 may be separate antennas or may be one antenna.

A processing process of outputting a received digital signal through the speaker 709 is as follows. The receiving antenna 701 of the electronic device 101 may receive a signal from an external electronic device (not shown). For example, the signal received may be a digital signal. The digital signal received through the receiving antenna 701 may be decoded through the decoder 703. The digital signal decoded through the decoder 703 may be input to the post-processing solution 705. The post-processing solution 705 may include a configuration for improving sound quality, adjusting sound volume, or cancelling noise. For example, the post-processing solution 705 may include a filter. At this time, the post-processing solution 705 may be controlled by at least one processor (not shown). The at least one processor may include, for example, an application processor (AP) or a communication processor (CP). The digital signal processed by the post-processing solution 705 may be amplified in the codec/amplifier 707 and may be converted into an analog signal. The converted analog signal may be output (or played) through the speaker 709.

An output process of transmitting an analog signal input to the microphone 711 is as follows. For example, the analog signal input to the microphone 711 may include an analog signal output from the speaker 709. For example, the analog signal input to the microphone 711 may include a voice signal received from a user. For convenience of description, the analog signal output from the speaker 709 will be described as an example. The analog signal input to the microphone 711 may be converted to a digital signal by passing the codec/amplifier 707 and may be amplified. The converted digital signal may be input to the pre-processing solution 713. The pre-processing solution 713 may include a configuration for improving sound quality, adjusting sound volume, or cancelling noise. The pre-processing solution 713 may include a configuration for cancelling an echo (e.g., an echo canceller). For example, the pre-processing solution 713 may include a filter. At this time, the pre-processing solution 713 may be controlled by at least one processor (not shown). The at least one processor may include an application processor (AP) or a communication processor (CP). The digital signal that has passed the pre-processing solution 713 may be encoded in the encoder 715. The electronic device 101 may transmit the encoded digital signal to the outside (or to the external electronic device) through the transmitting antenna 717.

According to an embodiment, the electronic device 101 may include an echo canceller (e.g., the echo canceller 313-1 of FIG. 3) for cancelling an echo. The echo canceller may cancel the echo by comparing a signal 720 and a signal 730. Hereinafter, for convenience of description, the signal 720 is referred to as a received reference signal (Rx reference signal). The signal 730 is referred to as an input signal. The input signal 730 may refer, for example, to a signal in which a signal output through the speaker 709 is re-input to the microphone 711.

According to an embodiment, the electronic device 101 may include a structure 721 (hereinafter, referred to as a pilot signal adder) for adding a pilot signal. For example, the electronic device 101 may include a circuit for generating a pilot signal and a circuit (e.g., a mixer) for adding the pilot signal and a reception signal that has passed the post-processing solution 705. However, the present disclosure is not limited thereto, and the pilot signal adder 721 may be implemented in another structure. Here, the reception signal may refer, for example, to a digital signal received through the receiving antenna 701. The pilot signal may be a reference signal for detecting an error of the received reference signal. For example, the pilot signal may include a periodic unit impulse signal, a plurality of periodic unit impulse signals, or signals in an inaudible frequency band. For example, the pilot signal may include a signal at a level that a user of the electronic device 101 cannot recognize or may include a signal that does not require a lot of resources. According to an embodiment, the period of the pilot signal may be changed. For example, among the entire sections to which the pilot signal is added, a first section may be set as a first period and a second section may be set as a second period. This is because in case that the period of the pilot signal is constant, the pilot signal may be cancelled in the entire sections in the process (e.g., down sampling) of the electronic device 101 is changing the sampling to transmit the input signal 730 received through the microphone 711 through the transmitting antenna 717. In this case, since the pilot signal for detecting an error is cancelled, it may be difficult for the electronic device 101 to detect an error. Accordingly, the period of the pilot signal may be changed for each section. However, the embodiment of the present disclosure is not limited thereto, and the embodiment of the present disclosure may include a pilot signal having a constant period.

According to an embodiment, the received reference signal 720 may be a reception signal that has passed the pilot signal adder 721 and the codec/amplifier 707. As described above, the received reference signal 720 may be a signal including the same content as the reception signal. The received reference signal 720 includes a pilot signal, but since the pilot signal itself has little information or is only data in an area that does not affect valid data, so it may be understood to include substantially the same content as the reception signal.

According to an embodiment, the electronic device 101 may include an error detector (e.g., including various processing circuitry and/or executable program instructions) 719. For example, the error detector 719 may include a device or a configuration for detecting an error of a signal. The echo canceller may cancel an echo by comparing the received reference signal 720 and an input signal 730 re-input to the microphone 711. Accordingly, the electronic device 101 may better cancel the echo only when an error does not occur in the received reference signal 720.

According to an embodiment, in order to detect whether an error has occurred in the received reference signal 720, the error detector 719 may obtain information on the received reference signal 720. The error detector 719 may detect an error through the received reference signal 720 to which the pilot signal is added. For example, the error detector 719 may identify whether an error has occurred in the received reference signal 720 by identifying whether the pilot signal has been cancelled or modified. A detailed example associated with this will be described in FIG. 9B.

According to an embodiment, in case that an error of the received reference signal 720 is detected through the error detector 719, the electronic device 101 may store information on the received reference signal 720 and may notify the user that an error has occurred in the received reference signal 720. Thereafter, the electronic device 101 may cancel an echo using the reception signal compensated based on information on the received reference signal 720.

Figure 8:
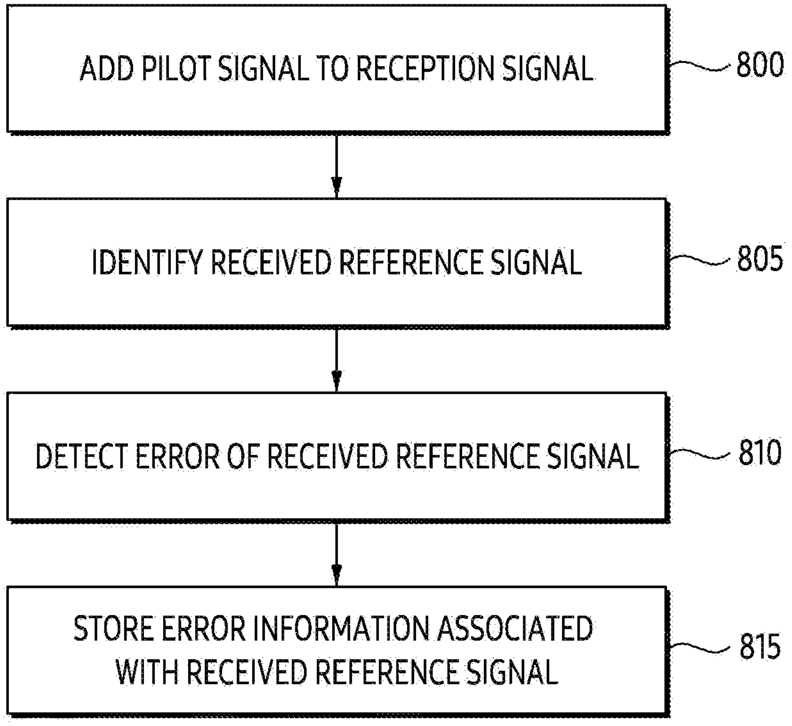
FIG. 8 is a flowchart illustrating an example method for detecting an error of a signal for cancellation of an echo according to various embodiments.

FIG. 8 is a flowchart illustrating an example method for detecting an error of a signal for cancellation of an echo according to various embodiments. For example, the echo may be generated when a signal received from an external electronic device is output through a sound output device of an electronic device and flows back into a microphone. For example, the error of the signal may include a case in which a distortion or mute occurs in the signal. In addition, in case that a path for obtaining information on the signal is incorrectly set or not set, the electronic device may identify as that an error of the signal has occurred. The method for detecting an error of the signal of FIG. 8 may be performed by the electronic device 101 of FIG. 7.

Referring to FIG. 8, in operation 800, an electronic device may add a pilot signal to the reception signal. For example, the reception signal may include a digital signal received from an external electronic device or the outside. For example, the electronic device may include a circuit for generating the pilot signal and a circuit (e.g., a mixer) for adding the pilot signal and a reception signal that has passed a post-processing solution. However, the present disclosure is not limited thereto, and a pilot signal adder may be configured in another structure. The pilot signal may be a reference signal for detecting an error of the received reference signal. For example, the pilot signal may include a periodic unit impulse signal, a plurality of periodic unit impulse signals, or signals in an inaudible frequency band. For example, the pilot signal may include a signal at a level that a user of the electronic device cannot recognize and may include a signal that does not require a lot of resources. According to an embodiment, the period of the pilot signal may be changed. For example, among the entire sections to which the pilot signal is added, a first section may be set as a first period and a second section may be set as a second period. This is because in case that the period of the pilot signal is constant, the pilot signal may be cancelled in the entire sections in the process (e.g., down sampling) of the electronic device is changing the sampling to transmit an input signal received through a microphone through a transmitting antenna. In this case, since the pilot signal for detecting an error is cancelled, it may be difficult for the electronic device to detect an error. Accordingly, the period of the pilot signal may be changed for each section. However, the embodiment of the present disclosure is not limited thereto, and the embodiment of the present disclosure may include a pilot signal having a constant period.

In operation 805, the electronic device may identify a received reference signal. For example, the electronic device may identify the reception signal to which the pilot signal is added as the received reference signal. For example, the electronic device may identify a signal that processed a reception signal to which the pilot signal is added through a codec/amplifier as a received reference signal (e.g., the received reference signal 720 of FIG. 7). The electronic device may obtain information on the received reference signal by identifying the received reference signal. The information on the received reference signal may include information on a frequency for each band, a gain, and delay of the received reference signal.

In operation 810, the electronic device may detect an error of the received reference signal. For example, the electronic device may identify whether the pilot signal included in the received reference signal has been cancelled or modified based on the information on the received reference signal. In case that the electronic device identifies that the pilot signal has been cancelled or modified, it may identify that an error has occurred in the received reference signal. For example, the electronic device may detect an error of the received reference signal.

In operation 815, the electronic device may store information on an error of the received reference signal. The electronic device may store information associated with the received reference signal in which the error is detected. For example, the electronic device may obtain and store information on an output path of the received reference signal in which the error is detected. Operation 815 may include converting information on the error into data and use it for a signal received thereafter, and thus may be omitted.

Although not shown in FIG. 8, an electronic device 101 may cancel the echo by performing operations 515 to 525 of FIG. 5 based on the received reference signal in which an error is detected in operation 810. For example, the device for detecting an error of a signal according to embodiments of the present disclosure may include a combination of the device of FIG. 4 and the device of FIG. 7. In addition, the method for detecting an error of a signal according to embodiments of the present disclosure may include a combination of the method of FIG. 5 and the method of FIG. 8.

Although not shown in FIG. 8, the electronic device may perform a connection for a voice call with an external electronic device before performing operation 800. For example, a user of the electronic device may perform a voice call with a user of the external electronic device. In addition, in case that an error of the received reference signal is detected, the electronic device may notify the user that an error of the received reference signal has occurred.

As described above, the device and method for detecting an error of a signal according to an embodiment of the present disclosure may detect an error of the received reference signal using a minimum of resources (e.g., 1 Mbyte). In addition, based on information on the detected error, an echo may be effectively cancelled. Accordingly, the device and method for detecting an error of a signal according to an embodiment of the present disclosure may provide a user with an opportunity to perform a high-quality voice call.

Figure 9A:
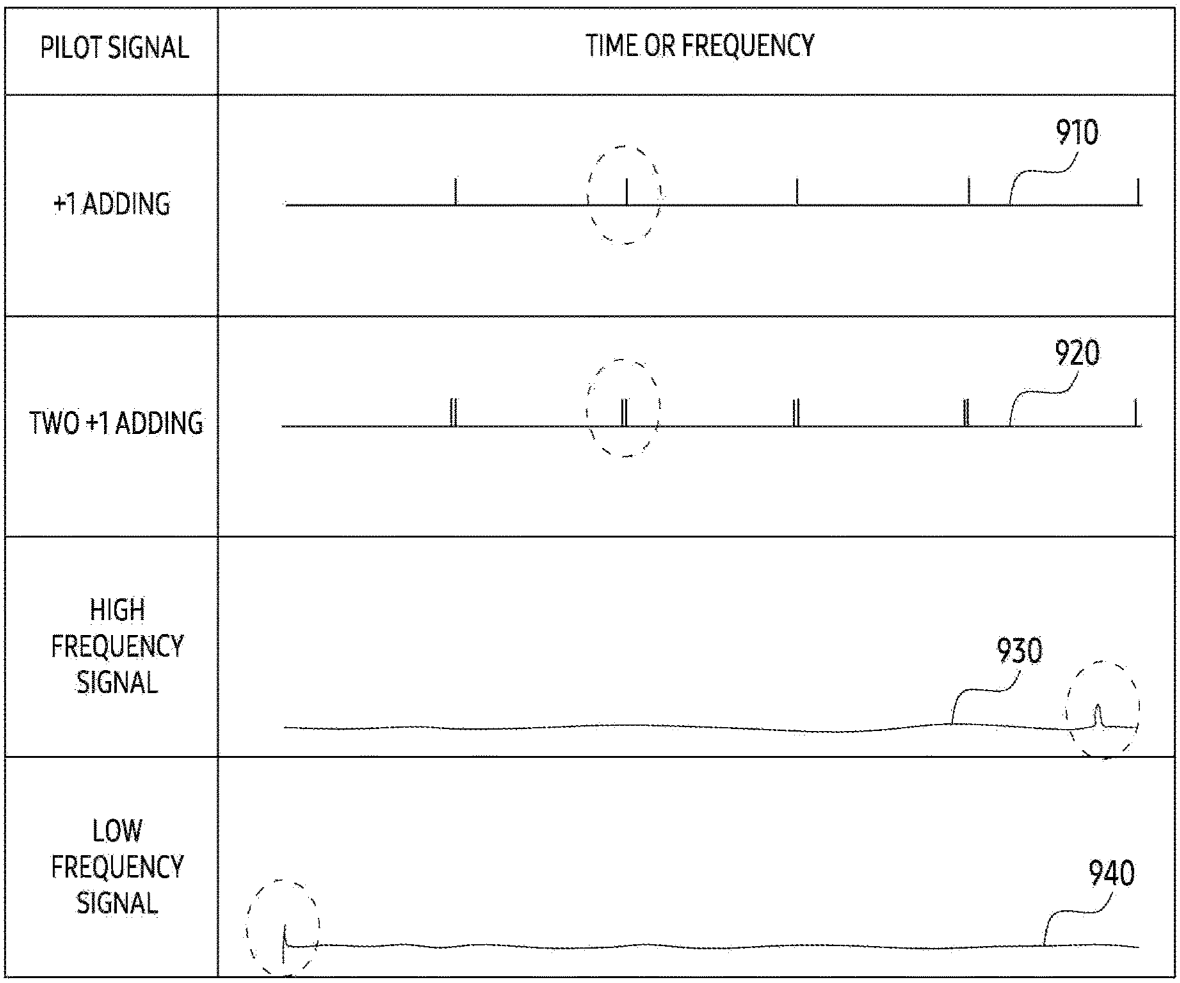
FIG. 9A is a diagram illustrating examples of a reference signal for detecting an error of a signal according to various embodiments.

FIG. 9A is a diagram illustrating examples of a reference signal for detecting an error of a signal according to various embodiments. Herein, the error of a signal may refer to an error of a received reference signal. The error of the received reference signal may include a case in which a distortion occurs, or a mute occurs. In addition, in case that a path for obtaining information on the received reference signal is incorrectly set or not set, the electronic device may identify as that an error of the signal has occurred. Herein, a reference signal for detecting an error may be a pilot signal. An electronic device of FIG. 9 may be understood as substantially the same as the electronic device 101 of FIG. 1. In addition, the electronic device of FIG. 9 may include the audio module 170 shown in the block diagram 200 of FIG. 2.

Referring to FIG. 9A, the pilot signal may include signals that require as few resources as possible and that the user of the electronic device cannot recognize. For example, the pilot signal may include a periodic unit impulse signal 910. The periodic unit impulse signal 910 represents a signal having a size of 1 is periodically formed over the entire frequency domain.

For example, the pilot signal may include a plurality of periodic unit impulse signals 920. The plurality of periodic unit impulse signals 920 represent two signals having a size of 1 are periodically formed over the entire frequency domain.

For example, the pilot signal may include a high frequency signal 930 or a low frequency signal 940. For example, the high frequency signal 930 may include a signal corresponding to a frequency band of about 20 kHz or higher. For example, the low frequency signal 940 may include a signal corresponding to a frequency band of about 20 Hz or lower. For example, the pilot signal may include a signal in an inaudible frequency band that the user of the electronic device cannot recognize.

Figure 9B:
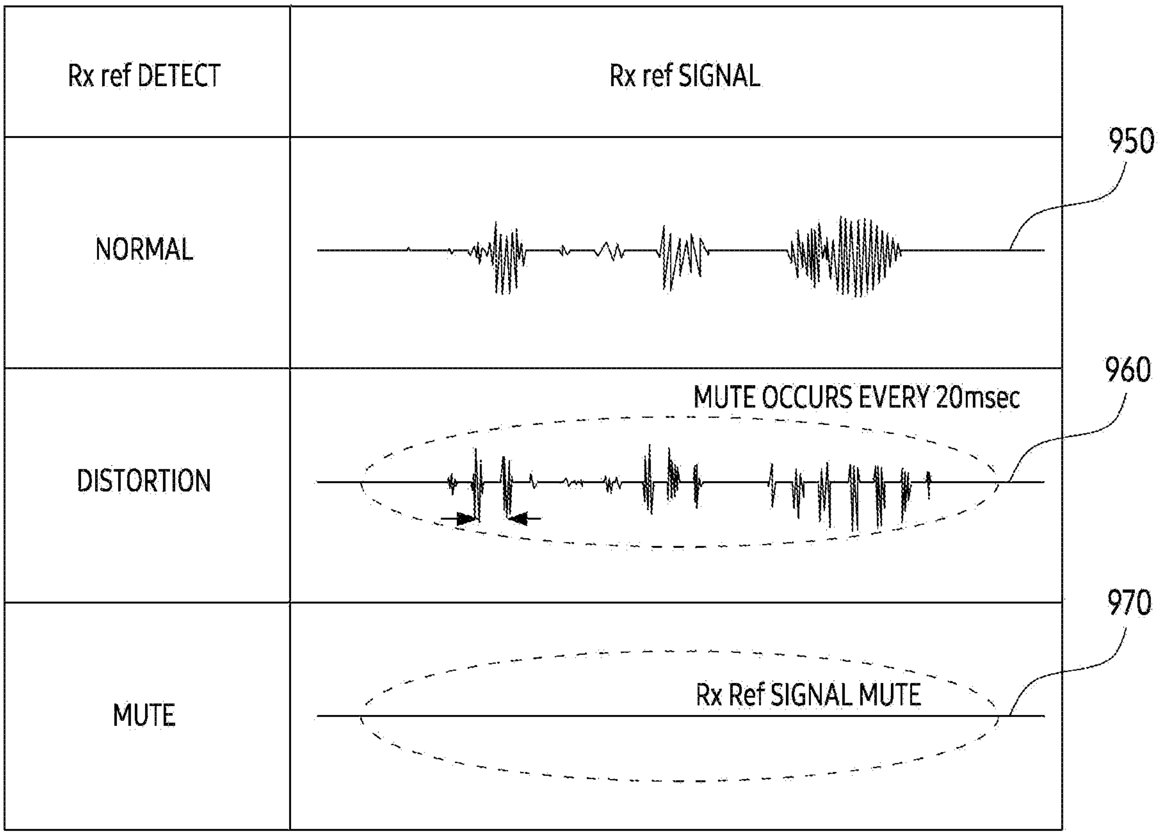
FIG. 9B is a diagram illustrating examples of waveforms of a received reference signal according to an error of a signal according to various embodiments.

FIG. 9B is a diagram illustrating examples of waveforms of a received reference signal according to an error of a signal according to various embodiments. Herein, the error of a signal may refer to an error of a received reference signal. The error of the received reference signal may include a case in which a distortion occurs, or a mute occurs. In addition, in case that a path for obtaining information on the received reference signal is incorrectly set or not set, an electronic device may identify as that an error of the signal has occurred. In addition, the received reference signal may be a signal including the same content as a signal received through the receiving antenna. An electronic device of FIG. 9B may be understood substantially the same as the electronic device 101 of FIG. 1. In addition, the electronic device of FIG. 9B may include the audio module 170 shown in the block diagram 200 of FIG. 2.

Referring to FIG. 9B, the received reference signal may be formed in a waveform as in a first example 950. The received reference signal of the first example 950 may be a normal signal in which distortion or mute does not exist.

Referring to a second example 960, the received reference signal may include a pilot signal, and when distortion occurs in the received reference signal, the pilot signal may also be affected. Accordingly, the pilot signal may be distorted or muted. Comparing the second example 960 and the first example 950, the received reference signal of the second example 960 may include a mute about every 20 msec in an area including the effective amplitude of the first example 950. For example, as the received reference signal is distorted, the pilot signal may be distorted or mutated. The electronic device may detect the distortion of the received reference signal by identifying the mute generated about every 20 msec.

Referring to a third example 970, the received reference signal may be muted. In case that the received reference signal is cancelled from the entire area, or a path for the electronic device to obtain information on the received reference signal is incorrectly set or not set, the electronic device may identify the received reference signal as muted. The received reference signal of the third example 970 may also include the pilot signal, and in case that the received reference signal is muted, the pilot signal may also be cancelled. Accordingly, the electronic device may detect the mute of the received reference signal by identifying that the pilot signal has been cancelled.

As described above, the device and method for detecting an error of a signal according to various embodiments of the present disclosure may detect an error of the received reference signal using fewer or as few resources as possible (e.g., 1 Mbyte). In addition, based on information on the detected error, an echo may be cancelled more effectively. Accordingly, the device and method for detecting an error of a signal according to an embodiment of the present disclosure may provide a user with an opportunity to perform a high-quality voice call.

In general, an electronic device may include an echo canceller for cancelling an echo. The echo canceller may be implemented through hardware, software, or a combination of hardware and software. The electronic device may cancel the echo by comparing a far-end signal and a near-end signal through the echo canceller. However, in case that an error occurs in the far-end signal used for cancellation of the echo, the echo may not be cancelled. Referring to FIGS. 1 to 9B, the device and method for detecting an error of a signal according to embodiments of the present disclosure may easily detect an error of a reference signal for the cancellation of the echo. The device and method for detecting an error of a signal according to the embodiments of the present disclosure may smoothly cancel the echo by performing compensation of a received signal to correspond to a signal in case that an error does not occur based on information on signals used to detect an error. In addition, the device and method for detecting an error of a signal according to the embodiment of the present disclosure may detect an error of a signal by adding the reference signal that requires only a minimum of resources without additional computation or allocation of memory. Accordingly, the device and method for detecting an error of a signal according to the embodiment of the present disclosure may provide a user with an opportunity to perform a high-quality voice call.

According to various example embodiments, an electronic device (101), comprises a microphone (150, 411). The electronic device (101) comprises a speaker (155, 409). The electronic device (101) comprises a communication circuit (190, 401). The electronic device (101) comprises at least one processor (120). The at least one processor (120) is configured to, based on decoding a first signal received through the communication circuit (190, 401) from an external electronic device, obtain a second signal (410). The at least one processor (120) is configured to output a third signal (420) through the speaker (155, 409) obtained based on executing decompression for the second signal (410). The at least one processor (120) is configured to compensate the second signal (410) based on a difference between the second signal (410) and the third signal (420) representing a distortion of the third signal (420), in response to obtaining an input signal (430) including the output third signal (420) through the microphone (150, 411). The at least one processor (120) is configured to execute cancellation of an echo of the input signal (430) based on the compensated second signal (410).

According to an example embodiment, the at least one processor (120) is further configured to transmit to the external electronic device a fourth signal obtained based on encoding the input signal (430) cancelled the echo.

According to an example embodiment, the electronic device (101) further comprises a plurality of speakers (155, 609-1, 609-2) including the speaker (155, 609-1) and another speaker (155, 609-2). The at least one processor (120) is configured to output a fifth signal (620-2) through the another speaker (155, 609-2) based on executing decompression for a second signal (610). The at least one processor (120) is configured to obtain another input signal (630-2) including the output fifth signal (620-2) through the microphone (150, 611-2). The at least one processor (120) is configured to compensate the second signal (610) based on the difference between the second signal (610) and the fifth signal (620-2) representing a distortion of the fifth signal (620-2). The at least one processor (120) is configured to execute cancellation of an echo of the another input signal (630-2) obtained based on the compensated second signal (410).

According to an example embodiment, the at least one processor (120) is configured to identify the difference representing the distortion of the third signal (420) based on information on the second signal (410) and information on the third signal (420). The at least one processor (120) is configured to compensate sound quality or volume of the second signal (410) based on information on the difference.

According to an example embodiment, the information on the second signal (410) includes at least one of a frequency of the second signal (410), a gain of the second signal (410), or information on a degree of delay of the second signal (410). The information on the third signal (420) includes at least one of a frequency of the third signal (420), a gain of the third signal (420), or information on a degree of delay of the third signal (420).

According to an example embodiment, the distortion of the third signal (420) is associated with the decompression or amplification for the second signal (410) or a path obtaining the third signal (420).

According to an example embodiment, the at least one processor (120) is configured to obtain a sixth signal for executing the decompression based on executing noise cancellation for the second signal (410). The at least one processor (120) is configured to execute the cancellation of the echo of the input signal (430) based on the second signal (410) in response to identifying a difference between the sixth signal and the second signal (410) representing a distortion of the sixth signal.

According to an example embodiment, a method performed by an electronic device (101), comprises, based on decoding a first signal received through a communication circuit (190, 401) of the electronic device (101) from an external electronic device, obtaining a second signal (410). The method comprises outputting a third signal (420) through a speaker (155, 409) of the electronic device (101) obtained based on executing decompression for the second signal (410). The method comprises compensating the second signal (410) based on a difference between the second signal (410) and the third signal (420) representing a distortion of the third signal (420), in response to obtaining an input signal (430) including the output third signal (420) through a microphone (150, 411) of the electronic device (101). The method comprises executing cancellation of an echo of the input signal (430) based on the compensated second signal (410).

According to an example embodiment, the method further comprises transmitting to the external electronic device a fourth signal obtained based on encoding the input signal (430) cancelled the echo.

According to an example embodiment, the method further comprises outputting a fifth signal (620-2) through another speaker (155, 609-2) of the electronic device (101) obtained based on executing decompression for the second signal (610). The method further comprises obtaining another input signal (630-2) including the output fifth signal (620-2) through the microphone (150, 611-2). The method further comprises compensating the second signal (610) based on the difference between the second signal (610) and the fifth signal (620-2) representing a distortion of the fifth signal (620-2). The method further comprises executing cancellation of an echo of the another input signal (630-2) based on the compensated second signal (410), The speaker (155, 609-1) and the another speaker (155, 609-2) are included in a plurality of speakers (155, 609-1, 609-2) of the electronic device (101).

According to an example embodiment, the method comprises identifying the difference representing the distortion of the third signal (420) based on information on the second signal (410) and information on the third signal (420). The method comprises compensating sound quality or volume of the second signal (410) based on information on the difference.

According to an example embodiment, the information on the second signal (410) includes at least one of a frequency of the second signal (410), a gain of the second signal (410), or information on a degree of delay of the second signal (410). The information on the third signal (420) includes at least one of a frequency of the third signal (420), a gain of the third signal (420), or information on a degree of delay of the third signal (420).

According to an example embodiment, the distortion of the third signal (420) is associated with the decompression or amplification for the second signal (410) or a path obtaining the third signal (420).

According to an example embodiment, the method further comprises obtaining a sixth signal for executing the decompression based on executing noise cancellation for the second signal (410). The method further comprises executing the cancellation of the echo of the input signal (430) based on the second signal (410) in response to identifying a difference between the seventh signal and the second signal (410) representing a distortion of the sixth signal.

According to an example embodiment, an electronic device (101), comprises a microphone (150, 411). The electronic device (101) comprises a speaker (155, 709). The electronic device (101) comprises a communication circuit (190, 701). The electronic device (101) comprises at least one processor (120). The at least one processor (120) is configured to, based on decoding a first signal received through the communication circuit (190, 701) from an external electronic device, obtain a second signal. The at least one processor (120) is configured to obtain a third signal in which a reference signal (721) is added to the second signal. The at least one processor (120) is configured to output a fourth signal (720) through the speaker (155, 709) obtained based on executing decompression for the third signal. The at least one processor (120) is configured to detect a distortion of the reference signal (721) included in an input signal (730), in response to obtaining the input signal (730) including the output fourth signal (720) through the microphone (150, 411).

According to an example embodiment, the reference signal (721) includes a signal on inaudible frequency or a unit impulse signal.

According to an example embodiment, the at least one processor (120) is configured to compensate the second signal based on a difference between the second signal and the fourth signal representing the distortion of the reference signal (721) based on detecting the distortion. The at least one processor (120) is configured to execute cancellation of an echo of the input signal (730) based on the compensated second signal.

According to an example embodiment, the at least one processor (120) is further configured to transmit, to the external electronic device, a fifth signal obtained based on encoding the input signal (730) cancelled the echo.

According to an example embodiment, the at least one processor (120) is configured to identify the difference representing the distortion of the reference signal (721) based on information on the second signal and information on the fourth signal. The at least one processor (120) is configured to compensate sound quality or volume of the second signal based on information on the difference. The information on the second signal includes at least one of a frequency of the second signal, a gain of the second signal, or information on a degree of delay of the second signal. The information on the fourth signal includes at least one of a frequency of the fourth signal, a gain of the fourth signal, or information on a degree of delay of the fourth signal.

According to an example embodiment, the distortion of the reference signal (721) is associated with the decompression or amplification for the second signal or a path obtaining the fourth signal.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
a microphone;
a speaker;
a communication circuit;
memory storing instructions; and
at least one processor comprising processing circuitry,
wherein the instructions, when executed by the at least one processor individually or collectively, cause the at least one processor to:
based on decoding a first signal received through the communication circuit from an external electronic device, obtain a second signal,
obtain a third signal to be output through the speaker based on executing decompression for the second signal,
obtain a fourth signal to be used for echo cancellation, based on processing the second signal,
compare the second signal with the fourth signal,
based on the fourth signal being identified via the comparison as including a distortion, compensate the second signal to provide a compensated second signal,
output, through the speaker, the third signal,
while the third signal is output, obtain an input signal through the microphone, and
execute echo cancellation with respect to the input signal based on the compensated second signal.

2. The electronic device of claim 1,
wherein the instructions, when executed by the at least one processor individually or collectively, cause the at least one processor to transmit to the external electronic device a fifth signal obtained based on encoding the echo cancelled input signal.

3. The electronic device of claim 1, further comprising,
a plurality of speakers including the speaker and another speaker,
wherein the instructions, when executed by the at least one processor individually or collectively, cause the at least one processor to:
obtain a sixth signal to be output through the another speaker based on executing decompression for the second signal,
obtain a seventh signal to be used for echo cancellation, based on processing the second signal,
compare the sixth signal with the seventh signal,
based on the seventh signal being identified as including a distortion via the comparison with the sixth signal and the seventh signal, compensate the second signal to provide the compensated second signal,
output, through the another speaker, the sixth signal, and
while the sixth signal is output, obtain another input signal through the microphone, and
execute echo cancellation with respect to the another input signal based on the compensated second signal.

4. The electronic device of claim 1,
wherein the instructions, when executed by the at least one processor individually or collectively, cause the at least one processor to:
based on the fourth signal being identified via the comparison as including the distortion, in accordance with information on the second signal and information on the fourth signal, compensate for sound quality or volume of the second signal.

5. The electronic device of claim 4,
wherein the information on the second signal includes at least one of a frequency of the second signal, a gain of the second signal, or information on a degree of delay of the second signal, and
wherein the information on the fourth signal includes at least one of a frequency of the fourth signal, a gain of the fourth signal, or information on a degree of delay of the fourth signal.

6. The electronic device of claim 1,
wherein the distortion included in the fourth signal is associated with the processing of the second signal or a path obtaining the fourth signal.

7. The electronic device of claim 1,
wherein the instructions when executed by the at least one processor individually or collectively, cause the at least one processor to:
based on the fourth signal being identified via the comparison as including the distortion, refrain from executing echo cancellation with respect to the input signal based on the fourth signal.

8. The electronic device of claim 1,
wherein the instructions, when executed by the at least one processor individually or collectively, cause the at least one processor to:
based on the fourth signal being identified via the comparison as not including the distortion, execute echo cancellation with respect to the input signal based on the fourth signal.

9. The electronic device of claim 1,
wherein the instructions, when executed by the at least one processor individually or collectively, cause the at least one processor to:
based on the fourth signal being identified via the comparison as not including the distortion, refrain from executing echo cancellation with respect to the input signal based on the second signal.

10. The electronic device of claim 1,
wherein the instructions, when executed by the at least one processor individually or collectively, cause the at least one processor to:
identify, via the comparison, the fourth signal including the distortion,
based on the fourth signal being identified as corresponding to an analog signal:
compensate for the second signal, and
execute the echo cancellation with respect to the input signal based on the compensated second signal, and based on the fourth signal being identified as corresponding to a digital signal:

refrain from compensating for the second signal, and execute echo cancellation with respect to the input signal based on the second signal.

11. A method performed by an electronic device including a microphone, a speaker, and a communication circuit, the method comprising:

based on decoding a first signal received through the communication circuit from an external electronic device, obtaining a second signal, obtaining a third signal to be output through the speaker based on executing decompression for the second signal, obtaining a fourth signal to be used for echo cancellation, based on processing the second signal, comparing the second signal with the fourth signal, based on the fourth signal being identified via the comparison as including a distortion, compensating for the second signal, outputting, through the speaker, the third signal, while the third signal is output, obtaining an input signal through the microphone, and executing echo cancellation with respect to the input signal based on the compensated second signal.

12. The method of claim 11, comprising:

transmitting to the external electronic device a fifth signal obtained based on encoding the echo cancelled input signal.

13. The method of claim 11, wherein the electronic device includes a plurality of speakers including the speaker and another speaker, and wherein the method comprises:

obtaining a sixth signal to be output through the another speaker based on executing decompression for the second signal, obtaining a seventh signal to be used for echo cancellation, based on processing the second signal, comparing the sixth signal with the seventh signal, based on the seventh signal being identified as including a distortion via the comparison with the sixth signal and the seventh signal, compensating for the second signal, outputting, through the another speaker, the sixth signal, and while the sixth signal is output, obtaining another input signal through the microphone, and executing echo cancellation with respect to the another input signal based on the compensated second signal.

14. The method of claim 11, comprising:

based on the fourth signal being identified via the comparison as including the distortion, in accordance with information on the second signal and information on the fourth signal, compensating for sound quality or volume of the second signal.

15. An electronic device, comprising:

a microphone;

a speaker;

memory storing instructions;

a communication circuit; and at least one processor comprising processing circuitry, wherein the instructions, when executed by the at least one processor individually or collectively, cause the at least one processor to:

based on decoding a first signal received through the communication circuit from an external electronic device, obtain a second signal, obtain a third signal in which a pilot signal is added to the second signal, output a fourth signal through the speaker obtained based on executing decompression for the third signal, detect a distortion of the pilot signal included in an input signal, in response to obtaining the input signal including the output fourth signal through the microphone, based on detecting the distortion of the pilot signal, compensate the second signal to provide a compensated second signal in accordance with a difference between the second signal and the fourth signal representing the distortion of the pilot signal, and execute echo cancellation with respect to the input signal based on the compensated second signal.

16. The electronic device of claim 15, wherein the pilot signal includes a signal on inaudible frequency or a unit impulse signal.

17. The electronic device of claim 15, wherein the instructions, when executed by the at least one processor individually or collectively, cause the at least one processor to transmit, to the external electronic device, a fifth signal obtained based on encoding the echo cancelled input signal.

18. The electronic device of claim 15, wherein the instructions, when executed by the at least one processor individually or collectively, cause the at least one processor to:

identify the difference representing the distortion of the pilot signal based on information on the second signal and information on the fourth signal, compensate sound quality or volume of the second signal based on information on the difference, wherein the information on the second signal includes at least one of a frequency of the second signal, a gain of the second signal, or information on a degree of delay of the second signal, and wherein the information on the fourth signal includes at least one of a frequency of the fourth signal, a gain of the fourth signal, or information on a degree of delay of the fourth signal.

19. The electronic device of claim 15, wherein the distortion of the pilot signal is associated with the decompression or amplification for the second signal or a path obtaining the fourth signal.

* * * * *